(12) United States Patent
Takeuchi

(10) Patent No.: US 7,848,856 B2
(45) Date of Patent: Dec. 7, 2010

(54) COMMUNICATION SYSTEM AND ELECTRONIC CONTROL UNIT INCLUDING COMMUNICATION SYSTEM FOR VEHICLE CONTROL

(75) Inventor: Yoshiharu Takeuchi, Kariya (JP)

(73) Assignee: Denso Corporation, Kariya-shi (JP)

( * ) Notice: Subject to any disclaimer, the term of this patent is extended or adjusted under 35 U.S.C. 154(b) by 437 days.

(21) Appl. No.: 11/984,871

(22) Filed: Nov. 23, 2007

(65) Prior Publication Data

US 2008/0125919 A1 May 29, 2008

(30) Foreign Application Priority Data

Nov. 27, 2006 (JP) ............................. 2006-318711

(51) Int. Cl.
*G05D 1/00* (2006.01)
(52) U.S. Cl. ................................ 701/1; 701/33; 701/35; 701/36; 342/357.1; 709/208
(58) Field of Classification Search .................... 701/1, 701/29, 33, 36; 709/207, 208, 213, 217; 342/357.09, 357.1; 455/39, 502, 509
See application file for complete search history.

(56) References Cited

U.S. PATENT DOCUMENTS

2006/0143348 A1 6/2006 Wilson et al.

FOREIGN PATENT DOCUMENTS

| EP | 1 553 731 | 7/2005 |
|---|---|---|
| JP | 4-203343 | 7/1992 |
| JP | 5-134982 | 6/1993 |
| JP | 5-303545 | 11/1993 |
| JP | 2000-299694 | 10/2000 |
| JP | 2002-300035 | 10/2002 |
| JP | 2004-080283 | 3/2004 |

OTHER PUBLICATIONS

Extended European Search Report dated Sep. 23, 2008, issued in counterpart European Application No. 07022143.7.2212.

*Primary Examiner*—Gertrude Arthur Jeanglaud
(74) *Attorney, Agent, or Firm*—Nixon & Vanderhye P.C.

(57) ABSTRACT

The communication system including a master device and a plurality of slave devices communicatably connected to the master device is configured such that a selected one of the slave devices which is applied with a communication permission signal from the master device through a corresponding one of control lines performs communication with the master device. The master device includes a switching circuit that changes internal connection thereof such that the communication permission signal is applied to another one of the slave devices which should perform communication with the master device next.

16 Claims, 20 Drawing Sheets

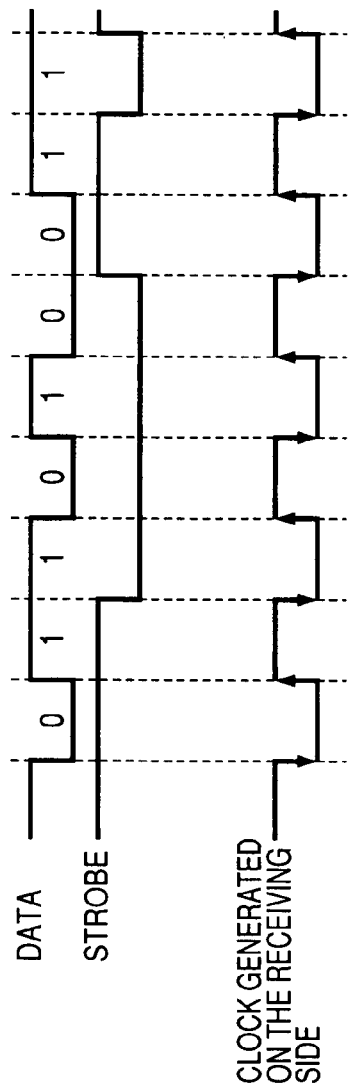
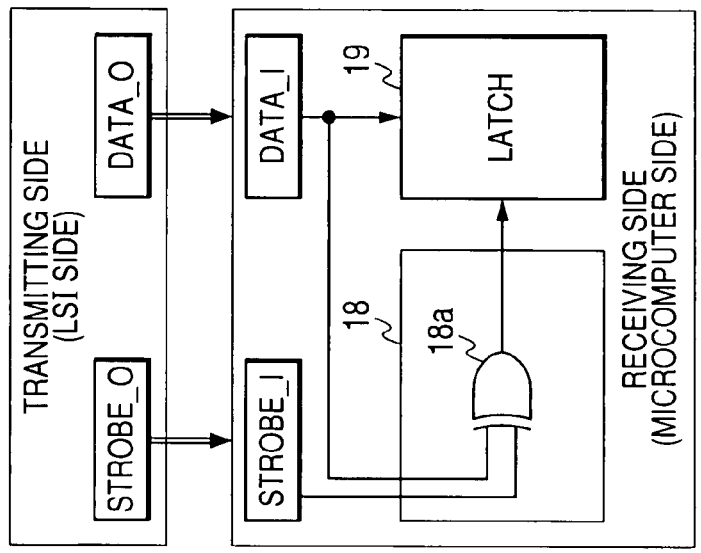

FIG. 7

TRANSMIT DATA ITEMS

| | | | |
|---|---|---|---|
| FFFF0000H | LSI (1) DATA ITEM 2 | LSI (1) DATA ITEM 1 | |
| FFFF0004H | LSI (1) DATA ITEM 4 | LSI (1) DATA ITEM 3 | |
| FFFF0008H | LSI (3) DATA ITEM 2 | LSI (3) DATA ITEM 1 | |
| FFFF000CH | | LSI (3) DATA ITEM 3 | |
| FFFF0010H | | | |
| FFFF0014H | | | |
| FFFF0018H | LSI (2) DATA ITEM 2 | | |
| FFFF001CH | LSI (2) DATA ITEM 1 | | |
| FFFF0020H | LSI (4) DATA ITEM 1 | | |
| FFFF0024H | LSI (4) DATA ITEM 2 | | |
| FFFF0028H | | | |
| FFFF002CH | | | |
| FFFF0030H | | | |

RECEIVE DATA ITEMS

| | | | |
|---|---|---|---|
| FFFF1000H | LSI (1) DATA ITEM 2 | LSI (1) DATA ITEM 1 | |
| FFFF1004H | LSI (2) DATA ITEM 2 | LSI (2) DATA ITEM 1 | |
| FFFF1008H | | LSI (2) DATA ITEM 3 | |
| FFFF100CH | | | |
| FFFF1010H | | | |
| FFFF1014H | | LSI (3) DATA ITEM 1 | |
| FFFF1018H | | LSI (3) DATA ITEM 2 | |
| FFFF101CH | | LSI (3) DATA ITEM 3 | |
| FFFF1020H | | LSI (4) DATA ITEM 1 | |
| FFFF1024H | | LSI (4) DATA ITEM 2 | |
| FFFF1028H | | LSI (4) DATA ITEM 3 | |
| FFFF102CH | | LSI (4) DATA ITEM 4 | |
| FFFF1030H | | | |

| DMAch | SELECTED CHANNEL | BIT | RAM ADDRESS SETTINGS | THE NUMBER OF DMA TRANSFERS |
|---|---|---|---|---|
| A | CS1, CS3 | 16 | FFFF0000H | 7 |
| B | CS1, CS3 | 32 | FFFF0018H | 4 |
| C | CS1, CS3 | 16 | FFFF1000H | 5 |
| D | CS1, CS3 | 32 | FFFF1014H | 7 |

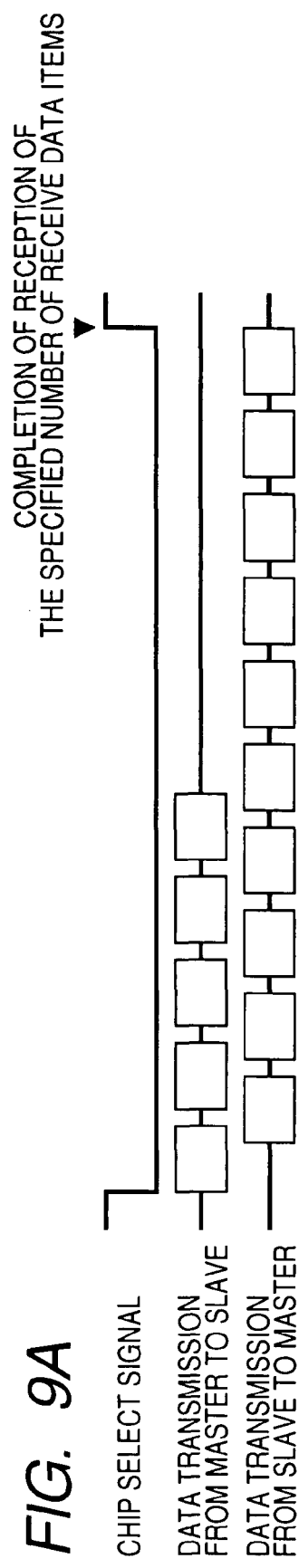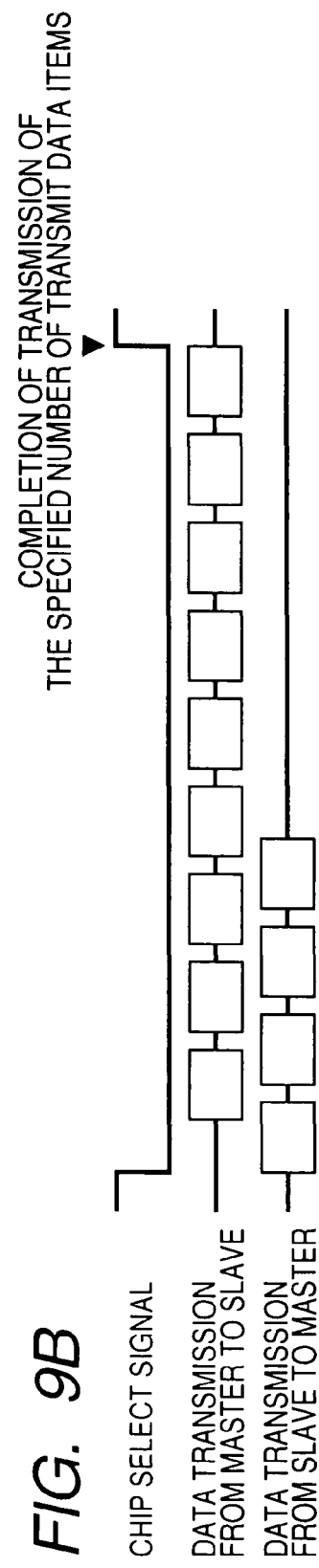

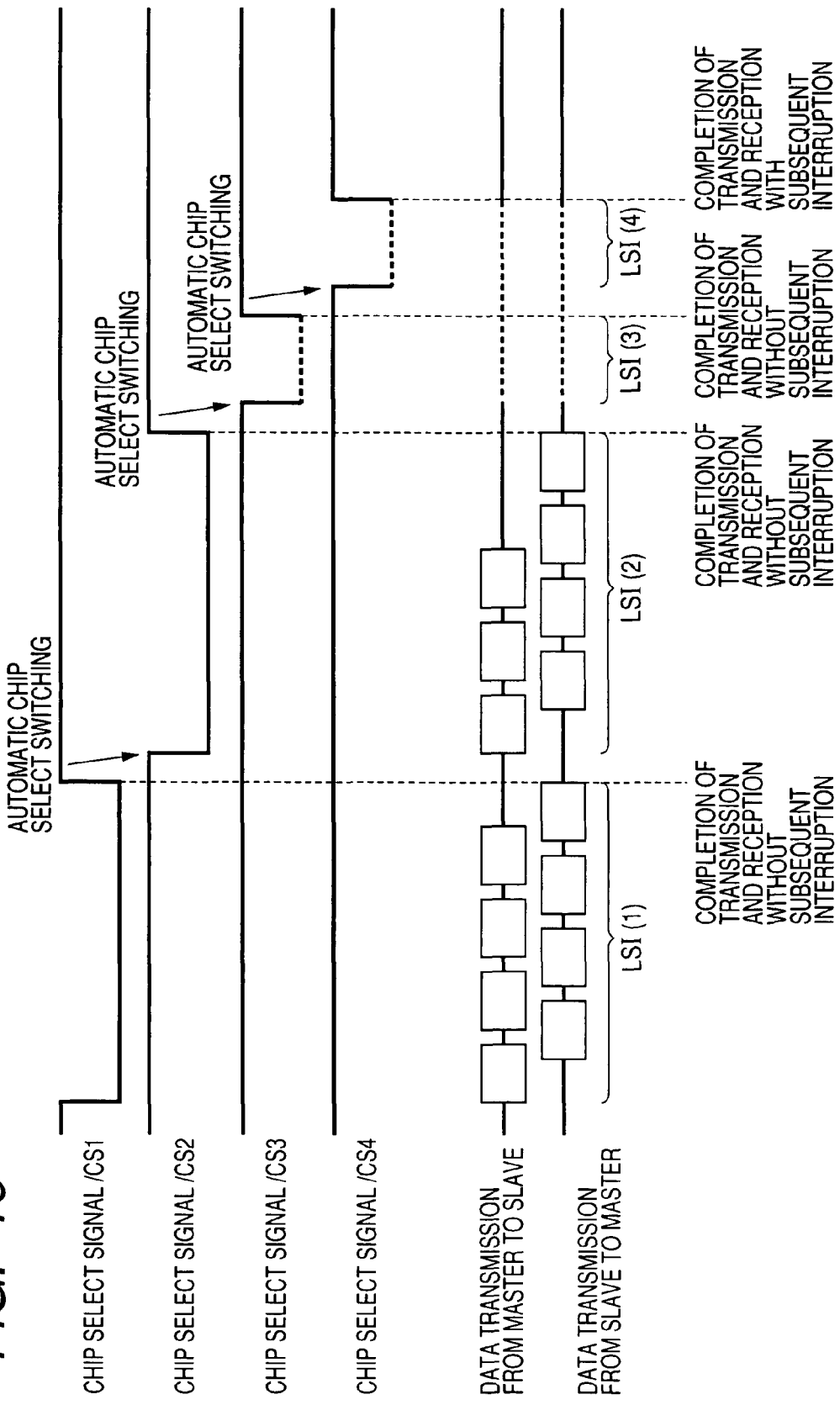

COMMUNICATION SYSTEM AND ELECTRONIC CONTROL UNIT INCLUDING COMMUNICATION SYSTEM FOR VEHICLE CONTROL

CROSS-REFERENCE TO RELATED APPLICATION

This application is related to Japanese Patent Application No. 2006-318711 filed on Nov. 27, 2006, the contents of which are hereby incorporated by reference.

BACKGROUND OF THE INVENTION

1. Field of the Invention

The present invention relates to a communication system including a master device and a plurality of slave devices with which the master device performs communication, and an electronic control unit including such a communication system for vehicle control.

2. Description of Related Art

Electronic Control Units used for vehicle control (referred to as "ECU" hereinafter) include a configuration in which a master device (a microcomputer, for example) communicates with a plurality of slave devices (ICs or LSIs, for example).

It is known to provide, between the master device and the slave devices of such an ECU, a switching circuit having a function of selecting from among a plurality of communication paths in accordance with a switch control signal received from the master device. For example, refer to Japanese Patent Applications Laid-open No. 5-134982, and No. 4-203343.

The apparatus disclosed in Japanese Patent Application Laid-open No. 5-134982 has a configuration in which a first microcomputer as a master device is connected to a second microcomputer and an A/D converter as slave devices through a switching circuit.

In this apparatus, the first microcomputer, which operates on the basis of a predetermined program, communicates with one of the second microcomputer and the A/D converter, which can be arbitrarily selected by setting a switching control signal supplied to the switching circuit at an active level or an inactive level.

However, the configuration in which the switching circuit is provided midway of the communication path causes a problem in that wiring in the apparatus becomes complicated, which causes the circuit scale and the production cost of the apparatus to increase.

To cope with this problem, it is known to use chip select signals for performing communication between a master device and a plurality of slave devices. For example, refer to Japanese Patent Application Laid-open No. 5-303545. This patent document discloses that a data transmission device as a master device is connected to a plurality of microcomputers as slave devices through a common communication path for data communication. In addition, the data transmission device and these microcomputers are connected through control lines carrying chip select signals (the control lines being referred to as "CS lines" hereinafter).

When the data transmission device sets one of the chip select signals to an active level, one of the microcomputers that has received the chip select signal at the active level determines that communication with the data transmission device is permitted, and sends data to the data transmission device.

That is, the data transmission device can perform communication with any desired microcomputer without causing data collision by setting one of the chip select signals to the active level, and setting the other chip select signals at the non-active level.

In the above described conventional apparatuses, the control of the switch control signal or the chip select signals is implemented by a software processing in the master device. For example, in the apparatus disclosed in Japanese Patent Application Laid-open No. 5-303545, the data transmission device has port terminals corresponding to the CS lines and port latches corresponding to the port terminals, and a CPU of the data transmission device executes a predetermined program to cause the port latches to latch data. For example, when one of these port latch latches "1", the chip select signal of this port latch becomes active level, while when it latches "0", this chip select signal becomes inactive level.

However, the above described conventional technique in which the master device performs a software processing for switching a plurality of communication objects, increase in the load of the master device caused by performing the software processing presents a problem. Especially, this problem becomes conspicuous when the frequency of a communication clock is high, that is when it is required to perform communication at high speed.

SUMMARY OF THE INVENTION

The present invention provides a communication system comprising:

a master device;

a plurality of slave devices;

a communication line commonly connecting the master device and the slave devices for data communication therebetween; and a plurality of control lines individually connecting the master device and the slave devices, the communication system being configured such that a selected one of the slave devices which is applied with a communication permission signal from the master device through a corresponding one of the control lines performs communication with the master device, wherein the master device includes:

a first counter counting a first number of data items that has been sent from the master device to the slave device performing communication with the master device;

a first comparator comparing the first number with a second number predetermined for the slave device performing communication with the master device, and outputting a first signal when the first and second numbers coincide with each other;

a second counter counting a third number of data items that has been sent to the master device from the slave device performing communication with the master device;

a second comparator comparing the third number with a predetermined fourth number, and outputting a second signal when the third and fourth numbers coincide with each other; and a switching circuit that changes internal connection thereof such that the communication permission signal is applied to another one of the slave devices which should perform communication with the master device next, when the first and second signals have been outputted from the first and second comparators, respectively.

The present invention also provides an electronic control unit for vehicle control comprising:
a master device;
a plurality of slave devices;
a communication line commonly connecting the master device and the slave devices for data communication therebetween; and
a plurality of control lines individually connecting the master device and the slave devices,
the master device, slave devices, communication line, and control lines constituting a communication system having a configuration that a selected one of the slave devices which is applied with a communication permission signal from the master device through a corresponding one of the control lines performs communication with the master device,
wherein the master device includes:
a first counter counting a first number of data items that has been sent from the master device to the slave device performing communication with the master device;
a first comparator comparing the first number with a second number predetermined for the slave device performing communication with the master device, and outputting a first signal when the first and second numbers coincide with each other;
a second counter counting a third number of data items that has been sent to the master device from the slave device performing communication with the master device;
a second comparator comparing the third number with a predetermined fourth number, and outputting a second signal when the third and fourth numbers coincide with each other; and
a switching circuit that changes internal connection thereof such that the communication permission signal is applied to another one of the slave devices which should perform communication with the master device next, when the first and second signals have been outputted from the first and second comparators, respectively.

According to the present invention, in a communication system or an electronic control unit in which a master device performs communication with a plurality of slave devices, it becomes possible to substantially reduce the load of the master device.

Other advantages and features of the invention will become apparent from the following description including the drawings and claims.

BRIEF DESCRIPTION OF THE DRAWINGS

In the accompanying drawings:
FIG. 4A is a block diagram showing the structure of a clock generating circuit included in the communication control circuit, and signal flow with the clock generating circuit;
FIG. 4B is a time chart showing how clock is generated in the clock generating circuit;
FIG. 7 is a diagram showing store positions of transmit data items and receive data items in a RAM included in the microcomputer;
FIG. 9A and FIG. 9B are time charts showing two examples of data communication between the microcomputer and the LSIs in which the number of transmit data items is different from the number of receive data items;
FIG. 10 is a time chart showing an example of an interruption generation timing.

PREFERRED EMBODIMENTS OF THE INVENTION

First Embodiment

Figure 1:
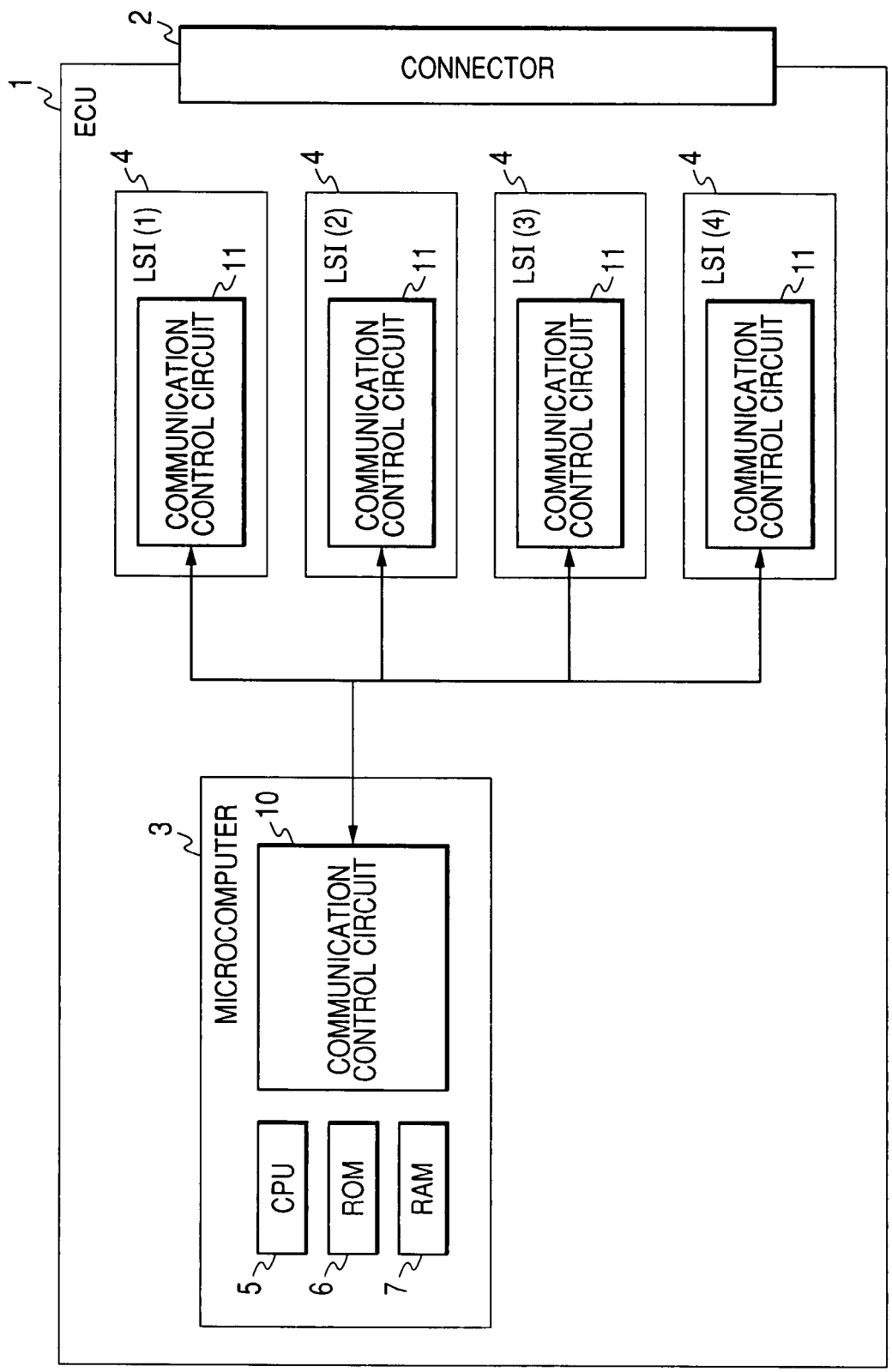
FIG. 1 is a diagram showing a structure of an ECU according to a first embodiment of the invention.

FIG. 1 is a diagram showing a structure of an electronic control unit (abbreviated as ECU hereinafter) 1 constituting therein a communication system according to a first embodiment of the invention.

The ECU 1, which is used for vehicle control, includes a connector 2, a microcomputer 3 as a master device, and four LSIs 4 as slaved devices. The connector 2 serves as an interface for connection between the ECU 1 and external devices.

Figure 2:
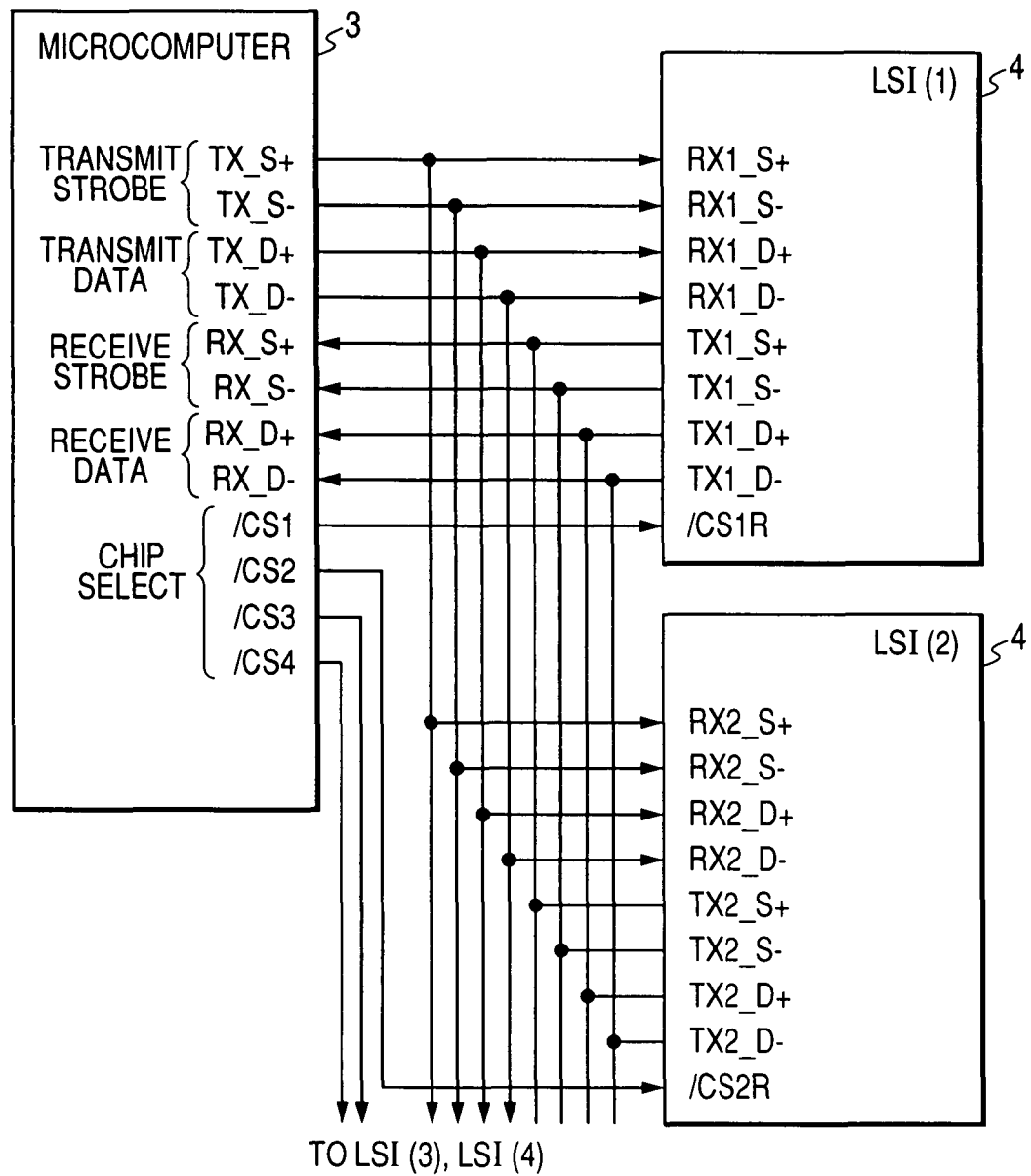
FIG. 2 is a connection diagram showing connections between a microcomputer and LSIs included in the ECU.

The microcomputer 3, which includes a CPU 5, a ROM 6, a RAM 7, controls the operation of the ECU 1. Each LSI 4, which is communicatably connected to the microcomputer 3, receives data from the microcomputer 3, and sends data as a result of processing the received data to the microcomputer 3. The microcomputer 3 includes a communication control circuit 10, and each LSI 4 includes a communication control circuit 11. Communications between the microcomputer 3 and the LSIs 4 are performed through the communication control circuits 10, 11. In the following explanation, to distinguish these four LSIs 4, they may be called LSI (1), LSI (2), LSI (3), LSI (4). FIG. 2 is a connection diagram showing the connections between the microcomputer 3 and the LSIs 4. Since the LSI (3) and LSI (4) are the same as LSI (1) and LSI (2) in their connections to the microcomputer, the LSI (3), LSI (4) are omitted from FIG. 2.

As shown in FIG. 2, the microcomputer 3 and the LSIs 4 are connected through a control line carrying a transmit strobe signal which the microcomputer 3 outputs to the LSIs 4, a communication line carrying data which the microcomputer 3 sends to the LSIs 4, a control line carrying a receive strobe signal which the LSIs 4 output to the microcomputer 3, and a communication line carrying data which the LSIs 4 send to the microcomputer 3. These communication lines and control lines are common for the LSI (1) to LSI (4). And each of these communication lines and control lines is a two-wired line, so that the microcomputer 3 and the LSIs 4 perform differential communication therebetween.

In addition, the microcomputer 3 and the LSIs 4 are connected through individual control lines each carrying a chip select signal (referred to as CS signal hereinafter) indicative of permission or inhibition of communication. In this embodiment, the LSI4 applied with the CS signal of active level (low level in this embodiment) determines that communication with the microcomputer 3 is permitted, and sends data to the microcomputer 3.

Figure 3:
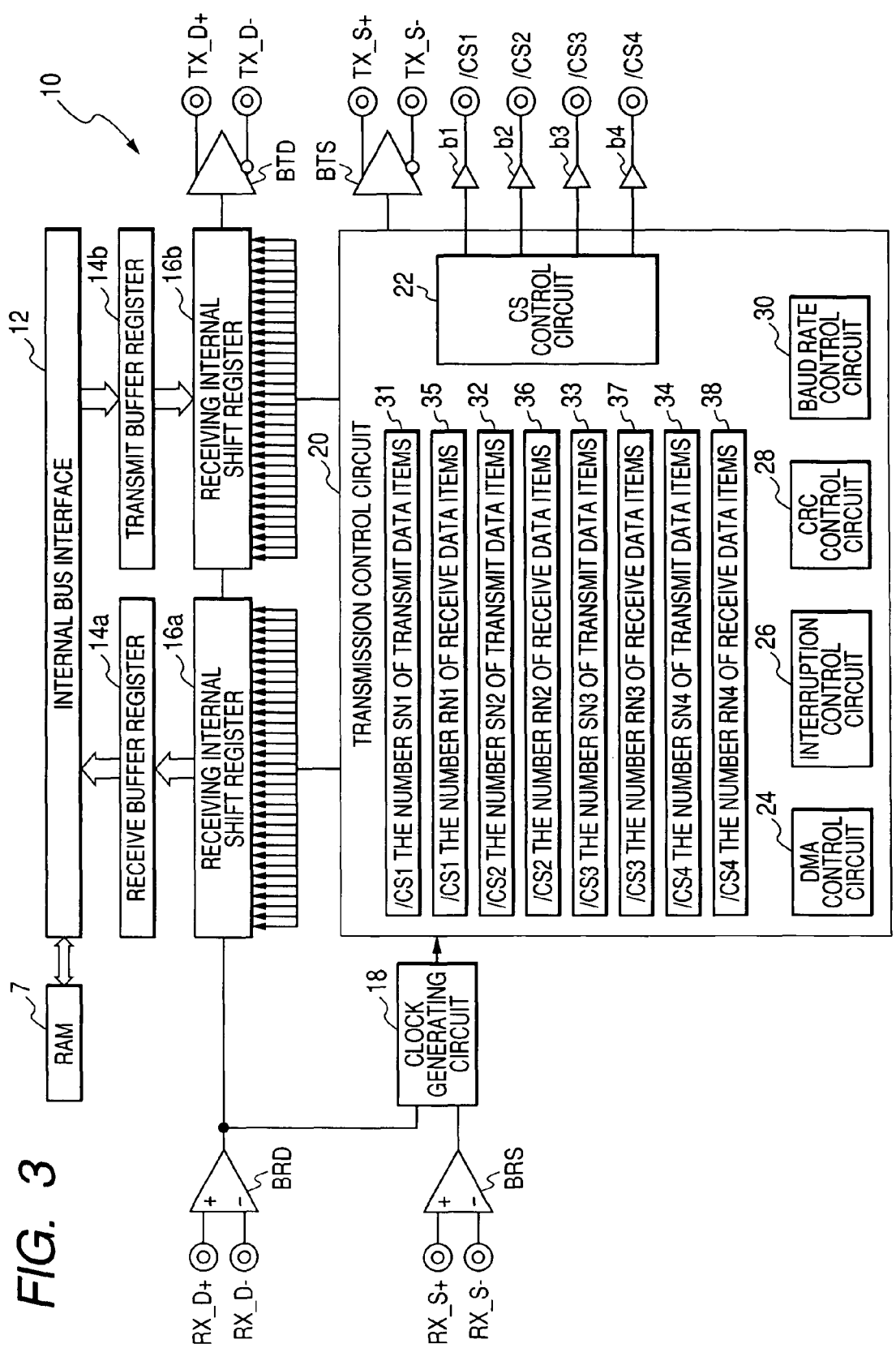
FIG. 3 is a diagram showing the structure of a communication control circuit included in the microcomputer.
Figure 5:
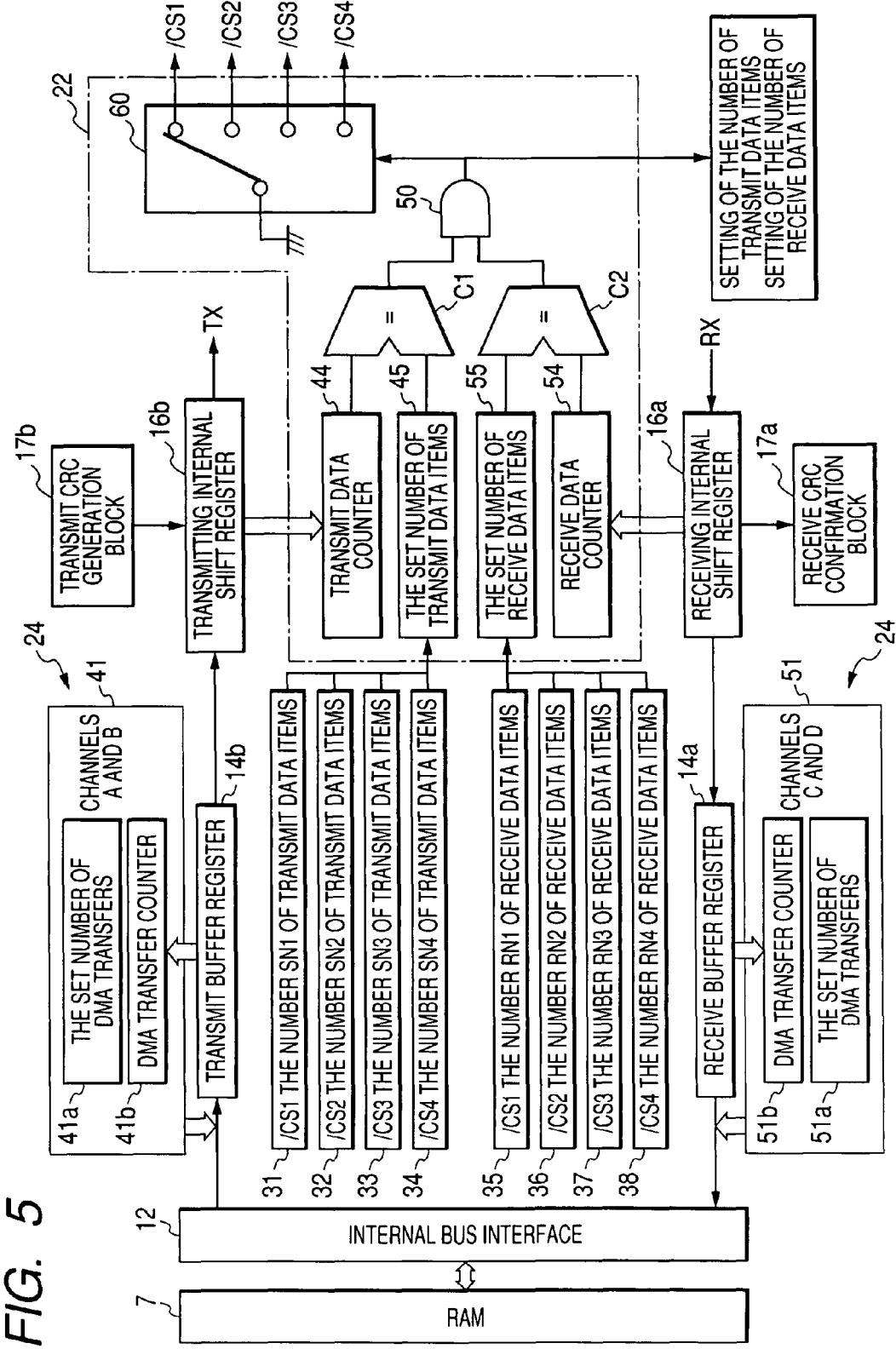
FIG. 5 is a diagram showing the structures of a CS control circuit included in the communication control circuit, and its periphery.

Next, explanation is made as to the structure and function of the communication control circuit 10 with reference to FIG. 3 to FIG. 5.

FIG. 3 is a diagram showing the structure of the communication control circuit 10. As shown in FIG. 3, the communication control circuit 10 is constituted mainly by an internal bus interface 12 connected to an internal bus of the microcomputer 3, a receive buffer register 14a, a transmit buffer register 14b, a receiving internal shift register 16a, a transmitting internal shift register 16b, a clock generating circuit 18, and a transmission control circuit 20.

Next, explanation is made as to data transmission and reception. Transmit data items to be sent to the LSIs 4, which are stored in the RAM 7, are transferred to the transmit buffer register 14b through the internal bus interface 12.

The transmit data items DMA-transferred to the transmit buffer register 14b are sent to the transmitting internal shift register 16b, and are further sent to the LSIs 4 through a driver BTD.

Receive data items received from the LSIs 4 are inputted to the receiving internal shift register 16a through a receiver BRD. The receive data items inputted into the receiving internal shift register 16a are sent to the receive buffer register 14a, and then are DMA-transferred from the receive buffer register 14a to the RAM 7 of the microcomputer 3 through the internal bus interface 12.

The receive data items from the LSIs 4 are also inputted into the clock generating circuit 18. The clock generating circuit 18 is also inputted with the receive strobe through the receiver BRS. The transmit strobe is outputted from a driver BTS, and the CS signal are outputted through buffers b1 to b4.

Next, explanation is made as to the structure and function of the clock generating circuit 18. FIG. 4A is a block diagram showing the structure of the clock generating circuit 18 and signal flow around the clock generating circuit 18.

As shown in this figure, the clock generating circuit 18 is constituted by an exclusive OR circuit 18a. The receive data items and the receive strobe are inputted to the exclusive OR circuit 18a. In FIG. 4A, the transmission side means the LSIs 4 side, and the reception side means the microcomputer 3 side.

As shown in FIG. 4B, the receive strobe is such a signal that its level changes when the data signal of receive data items continues at the same logic level, and does not change when the data signal does not continue at the same logic level.

The clock generating circuit 18 generates, as a clock, a signal which becomes high level when only one of the data signal (receive data item) and the strobe signal (receive strobe) is at logic "1", and becomes low level when both of them is at logic "1" or at logic "0".

In the microcomputer 3, the receive data items are latched in a latch circuit 19 (see FIG. 4A) at the falling and rising timings of the clock generated by the clock generating circuit 18. The above described method in which synchronization is made by use of the data signal and strobe signal is generally called data strobe method.

Referring back to FIG. 3, the transmission control circuit 20 includes a CS control circuit 22, a DMA control circuit 24, a interruption control circuit 26, a CRC control circuit 28, and a baud rate control circuit 30.

The transmission control circuit 20 further includes registers 31 to 34 for storing the numbers SN1 to SN4 of transmit data items to be sent to the LSI (1) to LSI (4), respectively, and registers 35 to 38 for storing the numbers RN1 to RN4 of receive data items to be received from the LSI (1) to LSI (4), respectively. When the microcomputer 3 is activated, the CPU 5 operates to store these numbers SN1 to SN4 and RN1 to RN4 are stored in the registers 31 to 38.

The CS control circuit 22 is a circuit for selecting a destination of the CS signal of active level from among the LSI(1) to LSI(4). In this embodiment, the CS control circuit 22 selects a destination of the CS signal of active level in order of from LSI(1) to LSI(4). Accordingly, the microcomputer 3 performs communication in order of from LSI(1) to LSI(4).

The DMA control circuit 24 operates to control DMA transfer of transmit data items and receive data items. The interruption control circuit 26 operates to generate an interruption at a certain timing.

The CRC control circuit 28 operates to add error check codes (CRC in this embodiment) to the transmit data items in accordance with predetermined conditions, and detect error in receive data items.

The baud rate control circuit 30 operates to control the number of modulation/demodulation operations to be performed per unit time in order that communication is performed at a desired communication bit rate. Next, explanation is made as to the CS control circuit 22 and the DMA control circuit 24 with reference to FIG. 5. FIG. 5 is a diagram showing the structures of the CS control circuit 22, the DMA control circuit 24, and their peripheries.

First, the CS control circuit 22 is explained. As shown in FIG. 5, the CS control circuit 22 includes a transmit data counter 44, a register 45 for storing the numbers SN1 to SN4 of transmit data items, a register 55 for storing the numbers RN1 to RN4 of receive data items, comparator circuits C1, C2, a logic product circuit 50, and a CS selection circuit 60.

The transmit data counter 44 operates to count the number of transmit data items. More particularly, the transmitting internal shift register 16b sends an inputted transmit data item to the driver BTD bit by bit. And when the transmitting internal shift register 16b has sent out bits of one data item, it outputs a transmission completion signal to the transmit data counter 44. In this way, the transmit data counter 44 counts the number of transmit data items.

The receive data counter 54 operates to count the number of receive data items. To be in more detail, the receiving internal shift register 16a is inputted with a receive data item through the receiver BRD bit by bit. And when the receiving internal shift register 16b has been inputted with bits of one data item, it outputs a reception completion signal to the receive data counter 54. In this way, the receive data counter 54 counts the number of receive data items.

The comparator circuit C1 compares the count value of the transmit data counter 44 with the number of transmit data items stored in the register 45. If they coincide with each other, the comparator circuit C1 outputs a high level signal. The comparator circuit C2 compares the count value of the receive data counter 54 with the number of receive data items stored in the register 55. If they coincide with each other, the comparator circuit C2 outputs a high level signal.

The output signals of the comparator circuits C1, C2 are inputted to the logic product circuit 50. The logic product circuit 50 outputs a high level signal only when the output signals of the comparator circuits C1, C2 are both at the high level.

The CS selection circuit 60 changes its internal connection upon receiving the high level signal from the logic product circuit 50 as explained below. When the microcomputer 3 is in an off state, the CS selection circuit 60 is in such a state that control lines CS1 to CS4 for respectively carrying the CS signals to the LSI(1) to LSI(4) are all in a non-connection state (ungrounded state). Afterward, when the microcomputer 3 commands start of communication (when the microcomputer 3 writes into a not shown communication starting register), the CS selection circuit 60 connects the control line CS1 to a ground line.

As a result, since the control line CS1 becomes active level (low level), the LSI(1) determines that communication with the microcomputer 3 is permitted, and starts communication with the microcomputer 3.

Afterward, when the CS selection circuit 60 receives the high level signal from the logic product circuit 60, it switches the connection to the ground line from the control line CS1 to the control line CS2.

In this way, the CS selection circuit 60 switches the connection between the ground line and the control lines in order of control line CS1→control line CS2→control line CS3→control line CS4→no connection. Consequently, the CS signals applied to the LSI(1) to LSI(4) becomes active level in sequence, and the microcomputer 3 performs communication with LSI(1) to LSI(4) in sequence.

Next, explanation is made as to the DMA control circuit 24. The DMA control circuit 24 includes DMA transfer control blocks 41, 51. The DMA transfer control block 41, which is dedicated to transmit data items, has a DMA channel A capable of DMA-transferring 16-bit data at once, and a DMA channel B capable of DMA-transferring 32-bit data at once. Each of the DMA channel A and the DMA channel B is provided with a register 41a for storing the number of DMA transfers, and a DMA transfer counter 41b for counting the number of times that DMA transfer has been performed.

The DMA transfer control block 51, which is dedicated to receive data items, has a DMA channel C capable of DMA-transferring 16-bit data at once, and a DMA channel D capable of DMA-transferring 32-bit data at once. Each of the DMA channel C and the DMA channel D is provided with a register 51a for storing the number of DMA transfers, and a DMA transfer counter 51b for counting the number of times that DMA transfer has been performed.

Figures 6A, 6B, 6C:
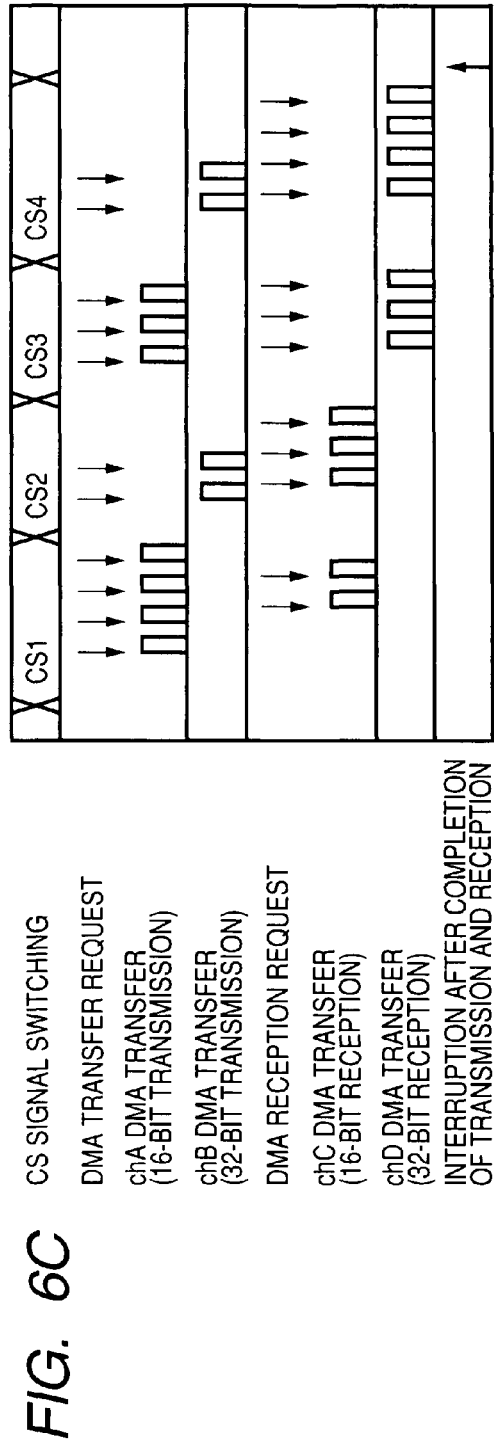
FIGS. 6A and 6B are tables showing information concerning DMA transfer stored in a ROM included in the microcomputer.
FIG. 6C is a diagram showing DMA transfer operation.

FIGS. 6A and 6B are tables showing information concerning DMA transfer which are stored in the ROM 6.

As shown in FIG. 6A, a data bit width (length), and the number of data items at the time of data transmission and at the time of data reception are specified for each of the LSI(1) to LSI(4). More particularly, the table of FIG. 6A defines a transmittable data bit width (length), a receivable data bit width (length), the number of data items to be sent, the number of data items to be received for each of the LSI(1) to LSI(4).

As shown in the table of FIG. 6B, each of the DMA channels A to D is assigned two of the CS channels (CS1 to CS4). And this tables includes RAM addresses each of which specifies a read start position of transmit data items or a write start position of receive data items in the RAM 7, and the number of DMA transfers for each of the DMA channels A to D.

FIG. 7 is a diagram showing store positions of transmit data items and receive data items in the RAM 7. In this embodiment, the RAM 7 can store 32-bit data in each address thereof.

As seen from FIG. 7, in this embodiment, there are stored, from the address "FFFF0000H" in the RAM 7, seven 16-bit transmit data items in all, including four 16-bit transmit data items to be sent to the LSI(1), and three 16-bit transmit data items to be sent to the LSI (3). In addition, there are stored, from the address FFFF0018H in the RAM 7, four 32-bit transmit data items to be sent to the LSI(2), and two 32-bit transmit data items to be sent to the LSI (4).

Also, as seen from FIG. 7, receive data items are stored in the RAM 7 such that 16-bit receive data items are stored from the address "FFFF1000H", and 32-bit receive data items are stored from the address "FFFF1014H". For example, in this embodiment, there are stored, from the address "FFFF1000H" in the RAM 7, five 16-bit receive data items in all, including two 16-bit receive data items received from the LSI(1), and three 16-bit receive data items received from the LSI(2). In addition, there are stored, from the address "FFFF1014H" in the RAM 7, seven 32-bit receive data items in all, including three 32-bit receive data items received from the LSI(3), and four 32-bit receive data items received from the LSI(4).

As shown in FIG. 6C, to perform communication with the LSI(1) when the CS signal on the control line CS1 is set at the active level, the DMA channel A for 16-bit data transmission and the DMA channel C for 16-bit data reception are activated.

When the communication with the LSI(1) is terminated, the DMA channel B for 32-bit data transmission and the DMA channel C for 16-bit data reception are activated to perform communication with the LSI(2). Communications with the LSI(3) and LSI(4) are performed in succession in the similar manner as above.

Next, explanation is made as to the operation of the transmission control circuit 20. When the CPU 5 of the microcomputer 3 commands the transmission control circuit 20 to perform communication, the transmission control circuit 20 operates to store the number SN1 of transmit data items to be sent to the LSI(1) (in this embodiment, "4" is stored in the register 45 as shown in FIG. 6A), and to store the number RN1 of receive data items to be received from the LSI(1) (in this embodiment, "2" is stored in the register 55).

In addition, the numbers of DMA transfers (see FIG. 6B) are stored in the register 41a of each of the DMA channel A and the DMA channel B and in the register 51a of each of the DMA channel C and the DMA channel D.

To send transmit data items, the DMA transfer block 41 operates on the basis of the information of FIG. 6A and FIG. 6B stored in the ROM 6, in order to activate the DMA channel A which should operates first. As seen from FIG. 6A, since the number of transmit data items to be sent is four, a DMA transfer request occurs four times, in order that four transmit data items (the first four data items starting from the address of "FFFF0000H" are DMA-transferred. In consequence, four transmit data items stored in the RAM 7 are DMA-transferred to the transmit buffer register 14b through the internal bus interface 12.

The transmit buffer register 14b transfers the transmit data items DMA-transferred thereto to the transmitting internal shift register 16b, and then outputs a transfer completion signal to the DMA transfer counter 41b. The DAM transfer counter 41b counts the transfer completion signal outputted from the transmit buffer register 14b to make it possible to recognize the number of times that the DMA transfer has been performed.

When four transmit data items are sent from the transmitting internal shift register 16b to the LSI(1), in other words, when the transmit data counter 44 counts up to 4, the comparator circuit C1 outputs a high level signal.

On the other hand, when the receiving internal shift register 16a has been inputted with two receive data items from the LSI(1), in other words, when the receive data counter counts up to 2, the comparator circuit C2 outputs a high level signal.

The DMA transfer control block 51 operates on the basis of the information of FIG. 6A and FIG. 6B, to activate the DMA channel C which should be activated first. As seen from FIG. 6A, since the number of receive data items to be received is two, a DMA transfer request occurs twice, in order that two receive data items (the first two data items starting from the address of "FFFF1000H" are DMA-transferred.

And when both the comparator circuits C1, C2 output a high level signal, the logic product circuit 50 outputs a high level signal to the CS selection circuit 60, as a result which the internal connection of the CS selection circuit 60 is switched so as to set the CS signal on the control line CS2 to the active level. In consequence, communication between the microcomputer 3 and the LSI(2) is started.

At this time, the logic product circuit 50 outputs a high level signal also to a not shown control circuit that stores data to be supplied to the registers 45, 55. This control circuit stores the register 45 with the number SN2 of transmit data items to be sent subsequently to the LSI(2), and stores the register 55 with the number RN2 of receive data items to be received.

When the DMA transfer with the DMA channel A has been performed four times, the DMA channel B which should subsequently operates is activated on the basis of the information of FIG. 6A, and FIG. 6B. In consequence, a DMA transfer request occurs twice so that two transmit data items (the first two data items starting from the address of "FFFF0018H" shown in FIG. 7) are DMA-transferred. Also, a DMA reception request occurs three times in succession in the DMA channel C so that three receive data items (the third to fifth data items starting from the address "FFFF1000H" shown in FIG. 7) are DMA-transferred and stored in the RAM 7.

As explained above, the microcomputer 3 operates such that a predetermined number of transmit data items are DMA-transferred from the RAM 7 and then sent to the LSIs 4, and a predetermined number of receive data items received from the LSIs 4 are DMA-transferred to the RAM 7. And the communication object is automatically switched among the LSI(1) to LSI(4), so that the microcomputer 3 can perform communication with the LSI(1) to LSI(4) in sequence.

As shown in FIG. 6C, when the communications with the LSI(1) to LSI(4) have been gone through, the interruption control circuit 26 generates an interruption in the microcomputer 3 (see FIG. 10).

Figure 8:
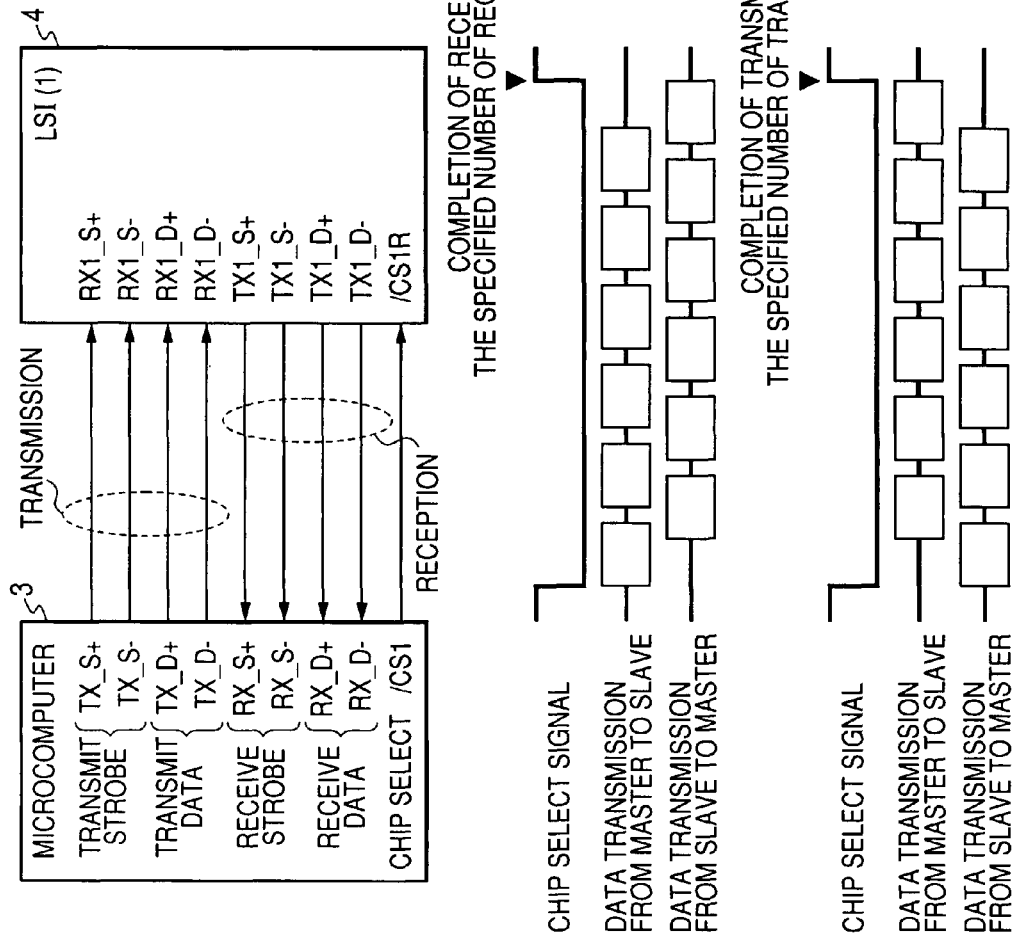
FIG. 8 is a time chart showing an example of data communication between the microcomputer and the LSIs.

Next, explanation is made as to how data communication is performed in the ECU 1 with reference to FIGS. 8 to 16. FIG. 8 is a time chart of an example of data communication between the microcomputer 3 and the LSI(1).

When the CPU 5 of the microcomputer 3 commands start of communication, the CS selection control circuit 60 sets the CS signal on the control line CS1 to the low level as the active level. Afterward, the microcomputer 3 sends transmit data items to the LSI(1), and receives receive data items sent from the LSI(1).

In this example, the number SN1 of transmit data items to be sent from the microcomputer 3, and the number RN1 of receive data items to be received from the LSI(1) are both 6. After the microcomputer 3 sends 6 transmit data items to the LSI(1), and receives 6 receive data items from the LSI(1), the internal connection of the CS selection circuit 60 is switched at a later one of the transmission completion timing and the reception completion timing so as to set the CS signal on the control line CS1 to the high level as the inactive level to thereby terminate the communication with the LSI (1).

Each of FIG. 9A and FIG. 9B is a time chart of an example of data communication between the microcomputer 3 and the LSI(1) in a case where the number of transmit data items is different from the number of receive data items. FIG. 9A shows an example in which the number of transmit data items is 5, and the number of receive data items is 10. FIG. 9B shows an example in which the number of transmit data items is 9, and the number of receive data items is 4.

Also in these examples, the CS signal is set to the inactive level at a later one of the transmission completion timing and the reception completion timing to terminate the communication with the LSI (1).

FIG. 10 is a time chart showing an example of an interruption generation timing. An interruption is generated by the interruption control circuit 26.

The interruption control circuit 26 reads the count value of the transmit data counter 44 to count the total number of transmit data items sent to the LSI(1) to LSI(4), and reads the count value of the receive data counter 54 to count the total number of receive data items received from the LSI(1) to LSI(4). When the counted number of transmit data items coincides with the sum of the numbers SN1 to SN4 of transmit data items, and the counted number of receive data items coincides with the sum of the numbers RN1 to RN4 of receive data items, an interruption is generated.

As explained above, when the microcomputer 3 has gone through the communications with the LSI(1) to LSI(4), an interruption is generated. When an interruption is generated, the CPU 5 of the microcomputer 3 executes a suspending task or an important task.

Figure 11:
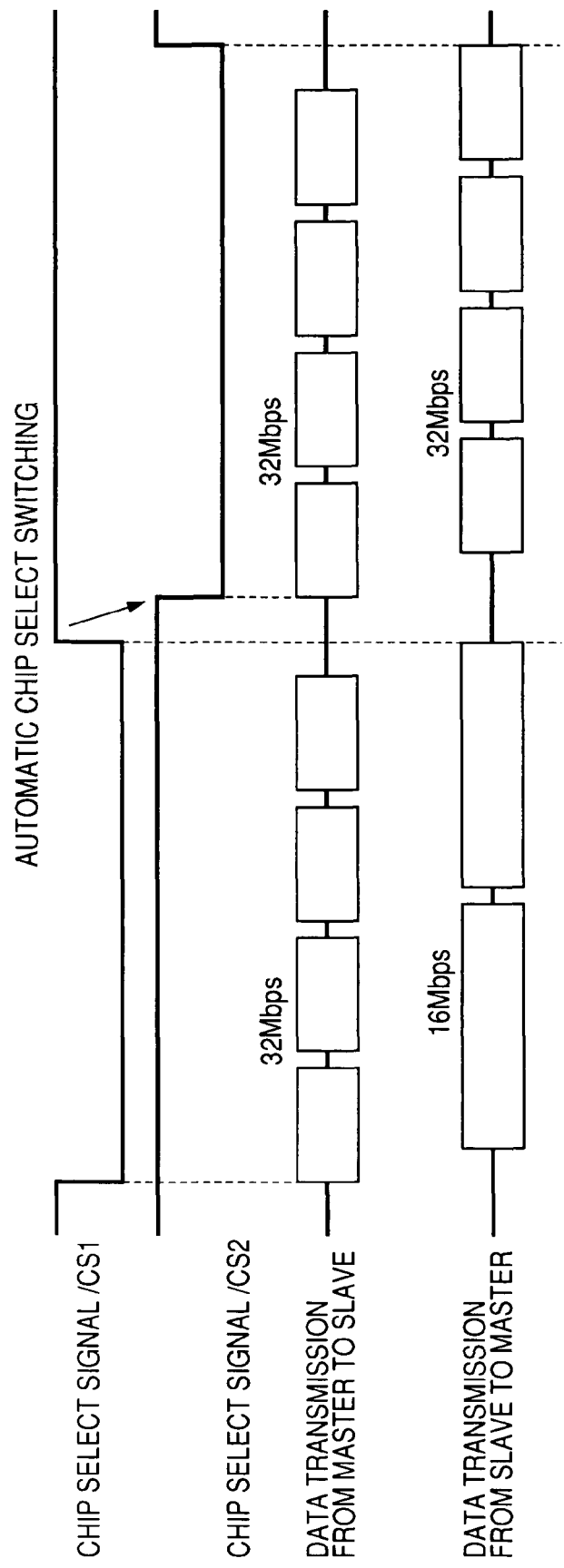
FIG. 11 is a time chart showing an example of data communication between the microcomputer and the LSIs in a case where the LSIs have different communication bit rates;
Each of FIGS. 12A and 12B is a time chart showing an example of data communication between the microcomputer and the LSIs in a case where error check codes are added to data items.

FIG. 11 is a time chart of an example of data communication between the microcomputer 3 and the LSI(1), LSI(2) in a case where the LSI(1) and LSI(2) have different communication bit rates.

The communication bit rate at which the microcomputer 3 can perform communication with the LSIs 4 depends on types, specifications, etc of the LSIs 4. Accordingly, this embodiment may be so configured that information concerning communication bit rates for communication with the LSIs 4 is stored in the ROM 6 or RAM 7, and the baud rate control circuit 30 sets a communication bit rate for each of LSIs 4 and for each of data transmission and data reception in accordance with this information. The baud rate control circuit 30 may be configured to adjust the clock frequency to set the communication bit rate to a desired value.

This configuration makes it possible for the microcomputer 3 to send data items at 32 Mbps and receive data items at 16 Mbps with the LSI(1), and to send data items at 32 Mbps and receive data items at 32 Mbps with the LSI(2), for example, as shown in FIG. 11.

Figure 12:
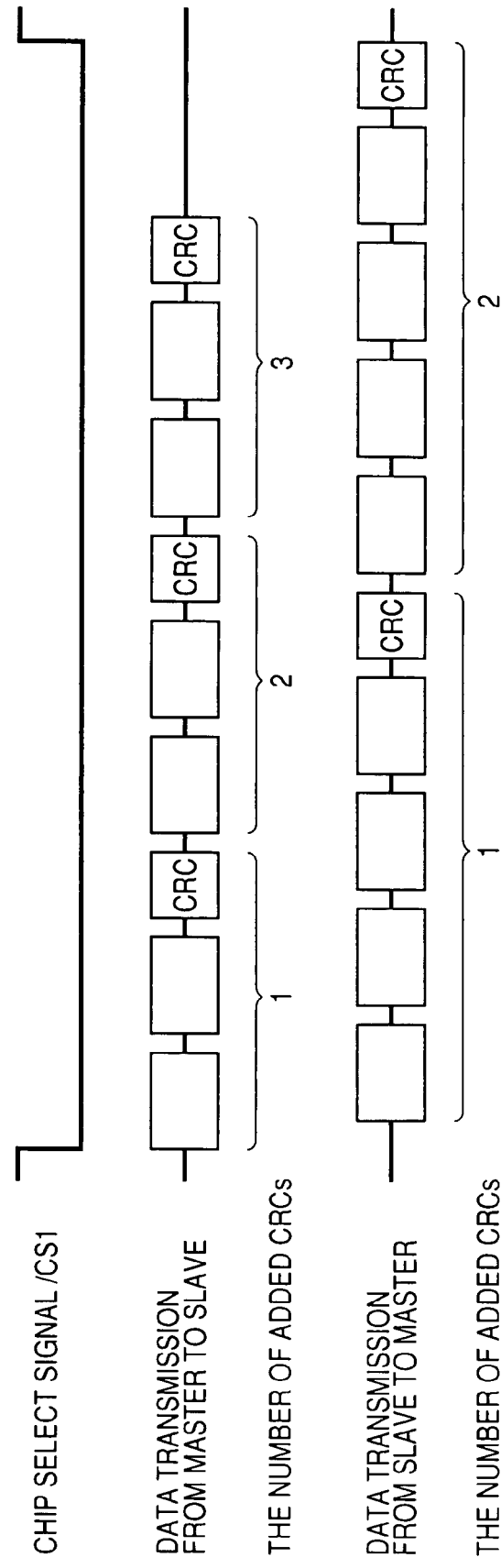

FIG. 12 is a time chart showing an example of data communication with the LSI(1) in a case where error check codes (CRC in this embodiment) are added to data items.

As described above, the microcomputer 3 includes the CRC control circuit 28 (see FIG. 3). The CRC control circuit 28 includes a receive CRC confirmation block 17a, and a transmit CRC generation block 17b (see FIG. 5). The receive CRC confirmation block 17a operates to detect error in receive data items. On the other hand, the transmit CRC generation block 17b operates to add CRCs to transmit data items in accordance with predetermined conditions. The communication control circuit 11 of each LSI4 has the same function as that of the CRC control circuit 28, and adds CRC to data items to be sent to the microcomputer 3.

There is stored in the ROM 6 (or RAM 7) of the microcomputer 3 the conditions concerning addition of CRC to data items as shown in FIG. 12A. The transmit CRC generation block 17b adds CRC to data items in accordance with the stored conditions. In this embodiment, conditions concerning addition of CRC to data items to be sent from LSI(1) to the microcomputer 3 are also stored in the ROM 6. That is, the ROM 6 stores the conditions concerning CRC addition for both of transmit data items and receive data items.

The transmit CRC generation block 17b adds three CRCs to every two transmit data items in accordance with the CRC addition conditions. To this end, the transmit CRC generation block 17b inputs CRCs to the transmitting internal shift register 16b each time the count value of the transmit data counter 44 increases by two, that is, each time two transmit data items are sent. At this time, in the register 45, there is set a value equal to the number SN1 to SN4 of transmission data items added by the number of added CRCs. To be in more detail, the number SN1 to SN4 of the transmit data items and the number of added CRCs are added together by a not shown adder circuit, and the value outputted from this adder circuit is inputted to the register 45. The above explanation is also applied to receive data items. That is, a value equal to the number RN1 to RN4 of receive data items added by the number of added CRCs is set in the register 55.

When CRCs have been inputted to the transmitting internal shift register 16b, transmit data items DMA-transferred to the transmit buffer register 14b are not outputted to the transmitting internal shift register 16b until these inputted CRCs are outputted from the transmitting buffer register 16b. And subsequent transmit data items are not DMA-transferred from the RAM 7 to the transmit buffer register 14b until current transmit data items are outputted from the transmit buffer register 14b.

Hence, when transmit data items are added with CRCs by the transmit CRC generation block 17b, transmit data items as many as the number of SN1 to SN4 are sent, and communication is terminated after the CRCs are set out.

Figure 13:
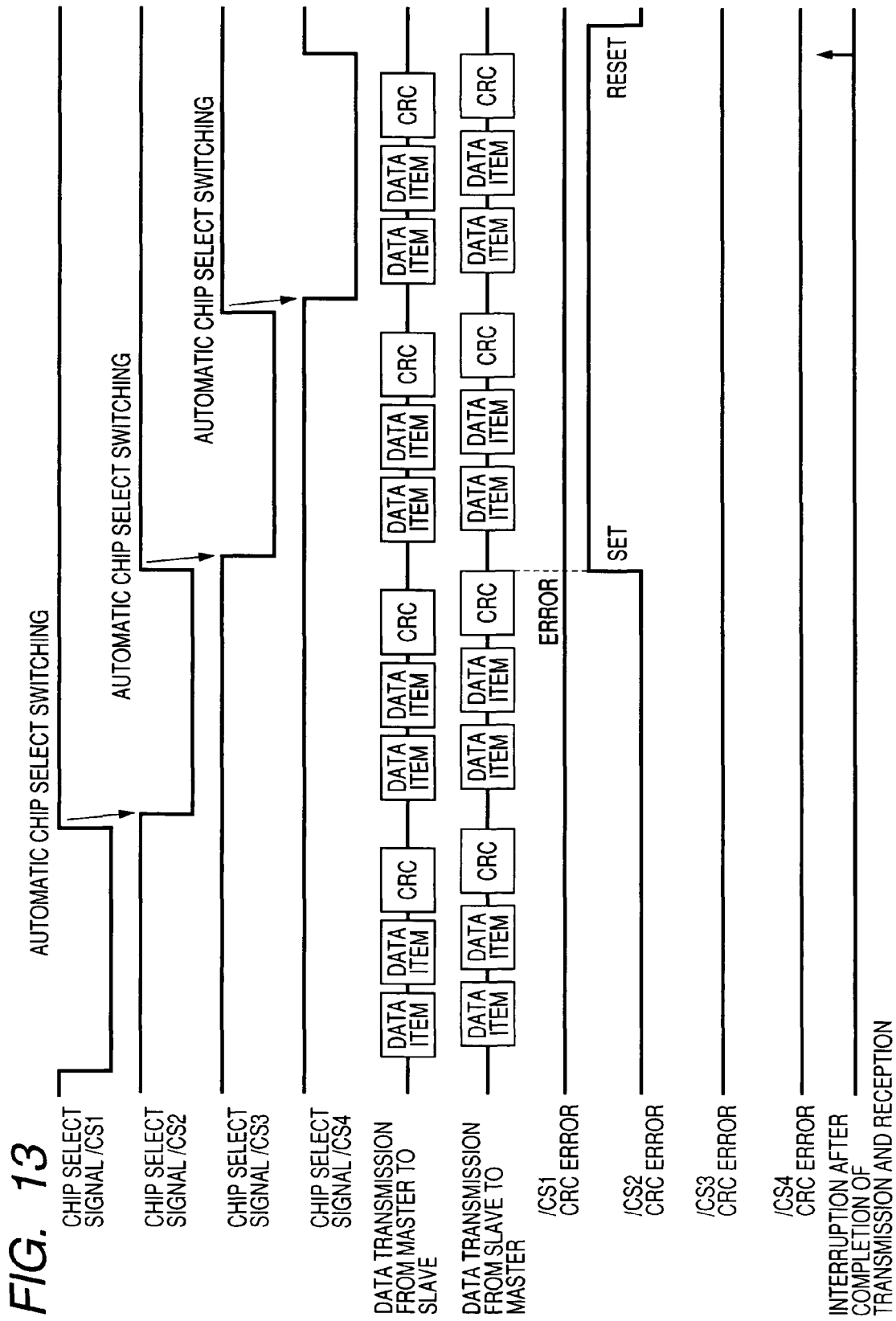
FIG. 13 is a diagram explaining how error is detected by use of the error check codes.

As shown in FIG. 13, the microcomputer 3 includes an error register for each of the LSIs 4, which is configured to be set with a flag when an error is detected.

For example, as shown in FIG. 13, when an error is detected by the receive CRC confirmation block 17a during communication with the LSI(2), a flag is set in the error register for the LSI(2) by the receive CRC confirmation block 17a.

Figure 14:
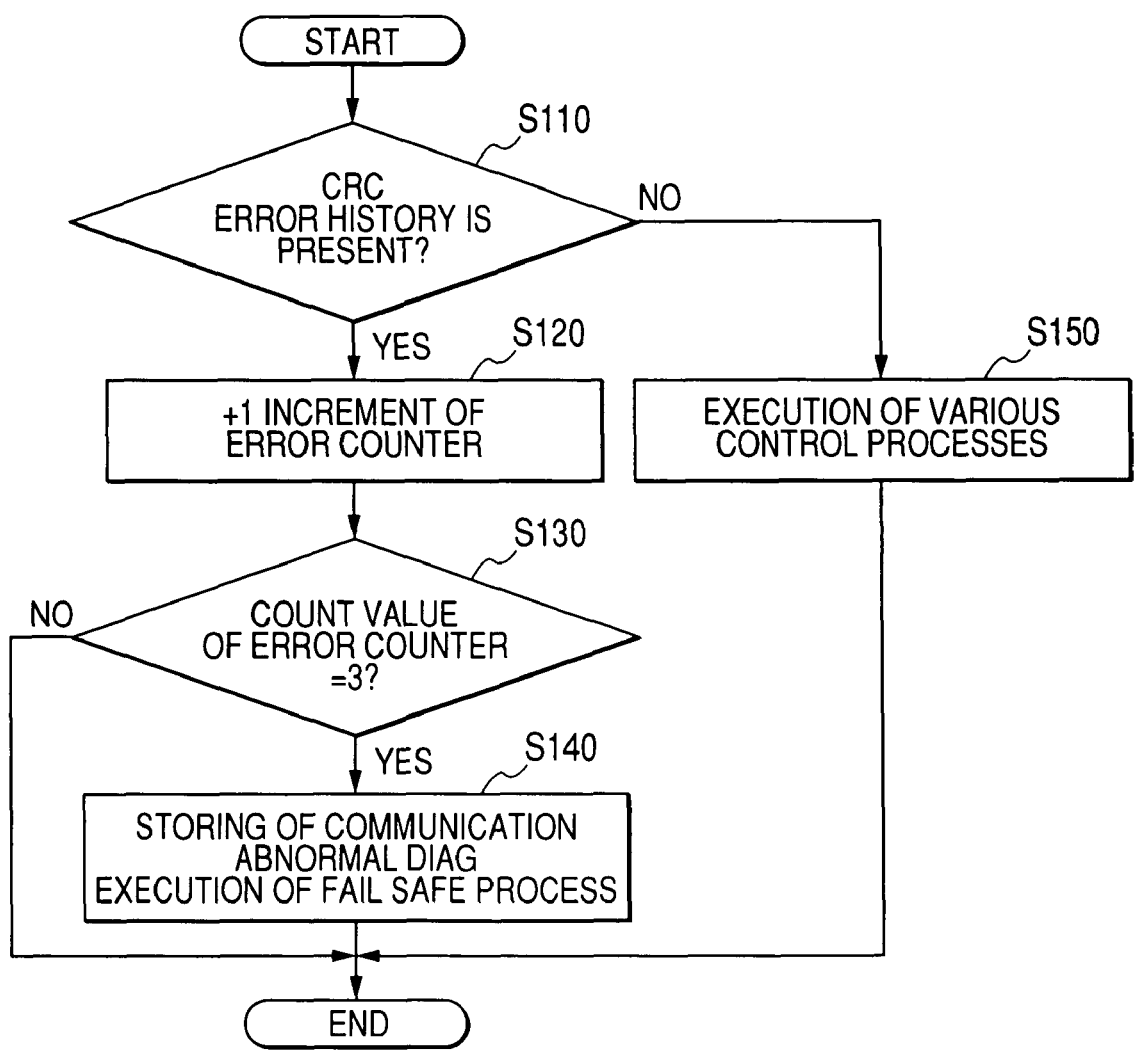
FIG. 14 is a flowchart showing error detection processing performed by a CPU of the microcomputer.

In addition, the CPU 5 of the microcomputer 3 performs a processing shown in FIG. 14 for each of the LSIs 4, when an interruption occurs. This processing begins by judging at step S110 whether or not an error history exists.

To be in more detail, it is judged at step S110 whether or not a flag is set in the error register. If it is judged that an error history exists, the processing proceeds to step S120 where a not shown error counter is incremented by one and the error register is reset.

Next, it is judged at step S130 whether or not the count value of the error counter is 3. If the judgment at step S130 is affirmative, the processing proceeds to step S140 where communication abnormality is stored in a not shown memory as diag information, and a predetermined fail-safe process is performed. If the judgment at step S130 is negative, that is, if the count value is smaller than 3, this processing is terminated.

Figure 15:
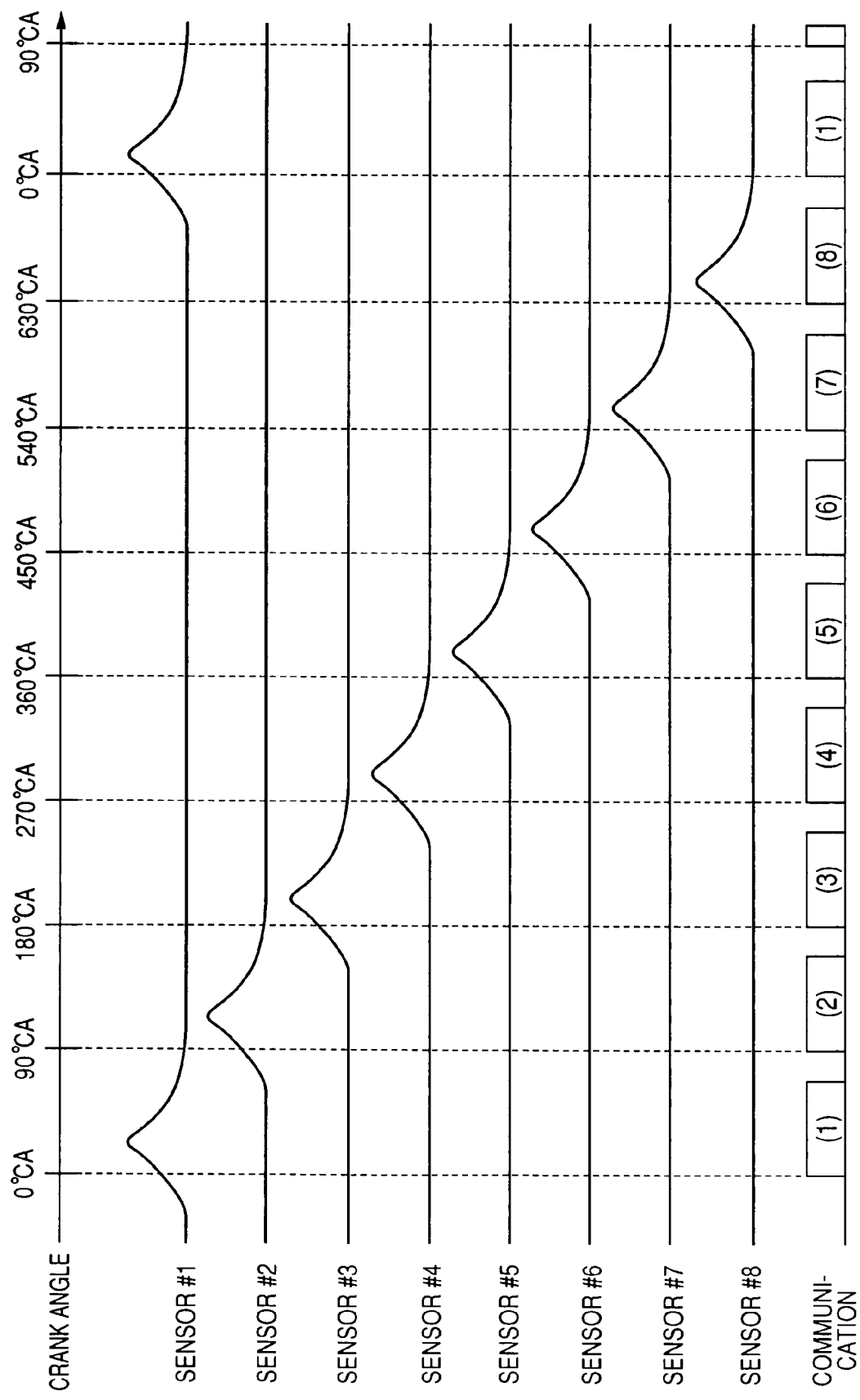
FIG. 15 is a diagram explaining an example of vehicle control performed by the ECU.

If it is judged that there exists no error history in step S110, the processing proceeds to step S150 where various processings are performed in accordance with received receive data items. FIG. 15 is a diagram explaining one example of vehicle control performed by the ECU 1. In this example, the four LSIs 4 perform A/D conversion on detection values from sensors #1 to #8 respectively mounted on 8 cylinders of a vehicle engine. The LSI(1) is assigned to the sensors #1, #2, LSI(2) is assigned to the sensors #3, #4, LSI(3) is assigned to the sensors #5, #6, and LSI(4) is assigned to the sensors #7, #8.

In the example shown in FIG. 15, each of the sensors #1 to #8 outputs a detection voltage at 0.5° CA intervals, that is, every 0.5° rotation of the engine crank shaft, and the LSIs 4 A/D-convert the detection voltages. The microcomputer 3 performs communication with each of the LSIs 4 every 90° CA to receive the A/D conversion results.

Figure 16:
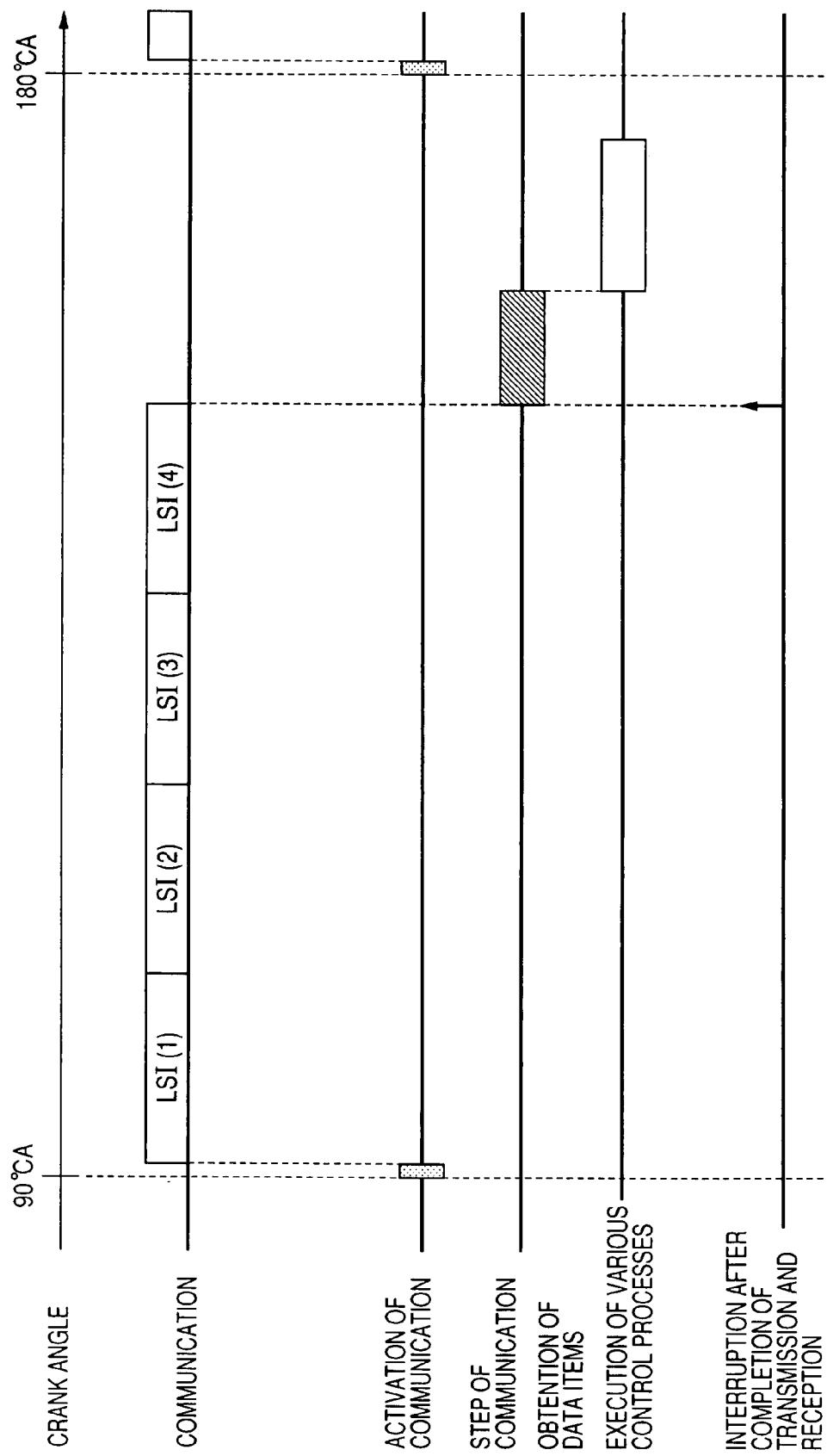
FIG. 16 is a diagram showing the details of a specific communication period shown in FIG. 15.

In the illustration of FIG. 15, the microcomputer 3 performs communication with the LSIs 4 during time periods indicated by (1) to (8). FIG. 16 is a diagram showing the detail of the period (2) shown in FIG. 15.

As shown in FIG. 16, the CPU 5 commands start of communication at the timing when the crank shaft reaches a 90° CA position. At this time, the CS signal on the control line CS1 becomes the active level first, and the microcomputer 3 performs communication with the LSI(1). After completion of the communication, the CS signal on the control line CS2 becomes the active level automatically, and the microcomputer 3 performs communication with the LSI(2). In a like manner, the microcomputer 3 performs communication with LSI(3), and LSI (4) in succession.

When the microcomputer 3 has gone through the communications with the LSI(1) to LSI(4), an interruption occurs, as a result of which the microcomputer 3 stops the communication with the LSIs 4 (that is, the CS selection circuit 60 is brought into the non-connection state), and performs various processings such as a misfire detection processing on the basis of received data items. The LSIs 4 performs the A/D conversion on the voltage values detected by the sensors #1 to #8 during this time period (during the time period after the timing of 90° CA).

And when it becomes the timing of 180° CA, the microcomputer 3 again performs communication with the LSIs 4. As explained above, the LSIs 4 obtain data from the sensors #1 to #8 during a time period lasting from the timing at which the previous communication with the microcomputer 3 was terminated until a time equivalent to 90° CA elapses.

Figure 17:
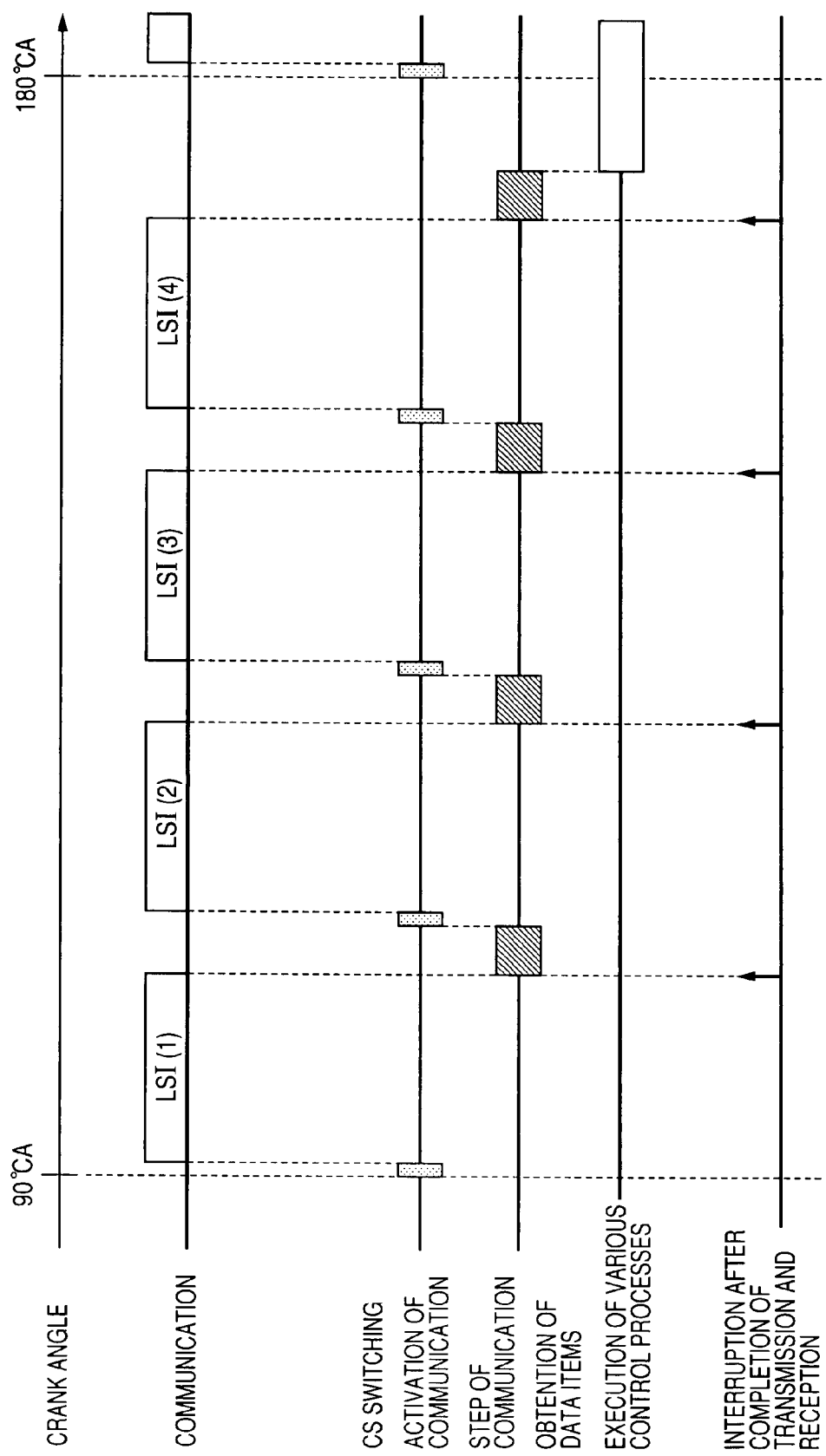
FIG. 17 is a diagram explaining how conventional data communication is performed.

In the following, an example of conventional data communication implemented mainly by software control is explained with reference to FIG. 17 for comparison purpose. In the example of FIG. 17, when it becomes the timing of 90° CA, communication is activated, and the CS signal on the control line CS1 becomes the active level by a software processing. And then the microcomputer 3 and the LSI(1) perform communication with each other. When the communication is terminated, an interruption occurs. In consequence, the microcomputer 3 stops communication with the LSIs 4 to perform an interruption processing. Afterward, communication is activated again, and the CS signal on the control line CS2 is switched to the active level by the software processing. And then the microcomputer 3 and the LSI(2) perform communication with each other. In a like manner, the microcomputer 3 performs communication with the LSI(3) and LSI(4) in succession. When the microcomputer 3 has gone through the communications with the LSI(1) to LSI(4), it performs various processings on the basis of received data items.

In the conventional data communication as described above, since the CS signal is switched by performing the software processing each time communication with one of the LSIs 4 is terminated, the load of the CPU 5 is high. In addition, switching the level of the CS signal takes time.

Furthermore, since an interruption occurs every time the CS signal is switched, the load of the CPU 5 further increase.

Accordingly, there may occur a case where all the necessary processings cannot be performed within a given period. For example, as shown in FIG. 17, the processings for the various controls are not done before the timing at which the next time communication is started (the timing of 180° CA). In this case, it results that controls are not performed properly.

The first embodiment offers the following advantages. As has been explained hereinabove, this embodiment has such a configuration that the CS signal is switched automatically by a hardware configuration, and an interruption automatically occurs when the microcomputer 3 has gone through communication with the LSIs 4. Accordingly, the load of the CPU 5 can be made small, and the microcomputer 3 can perform communication continuously with the LSI(1) to LSI(4) as shown in FIG. 16. Hence, all the necessary processings for various controls can be performed without fail within a given time period.

In this embodiment, the number of transmit data items and the number of receive data items are stored individually, and the CS signal is switched at a later one of the timing at which transmission is completed and the timing at which reception is completed. This makes it possible to reliably perform communications between the microcomputer and the LSIs 4.

Transmit data items and receive data items are DMA-transferred by the DMA control circuit 24. This makes it possible to prevent increase of the load of the CPU 5. In addition, since the number of DMA transfers is stored in association with the numbers of transmit data items to be sent and receive data items to be received, the DMA transfer operation and the data transmission/reception operation can be performed in conjunction with each other.

This embodiment has the configuration enabling the microcomputer 3 to perform communication with the LSIs 4 even in a case where a possible communication bit rate and a data bit length differs for each of the LSIs 4. This makes it possible for the microcomputer 3 to have versatility.

The microcomputer 3 is configured to add CRCs to transmit data items by a hardware configuration (CRC control circuit 28). This makes it possible to increase reliability of data communication without increasing the load of the CPU 5. If error is detected in receive data items added with CRCs, a flag is set in the error register. This makes it possible to perform a fail-safe process in an abnormal case.

This embodiment employs the data strobe method in which synchronization is obtained by use of a data signal and a strobe signal. This provides the advantages that noise can be reduced, and it becomes unnecessary to adjust for time discrepancy between the data signal and the clock signal.

Second Embodiment

Next, an ECU 1 constituting therein a communication system according to a second embodiment of the invention is explained. The following explanation focuses on the difference between the first embodiment and the second embodiment.

Figure 18:
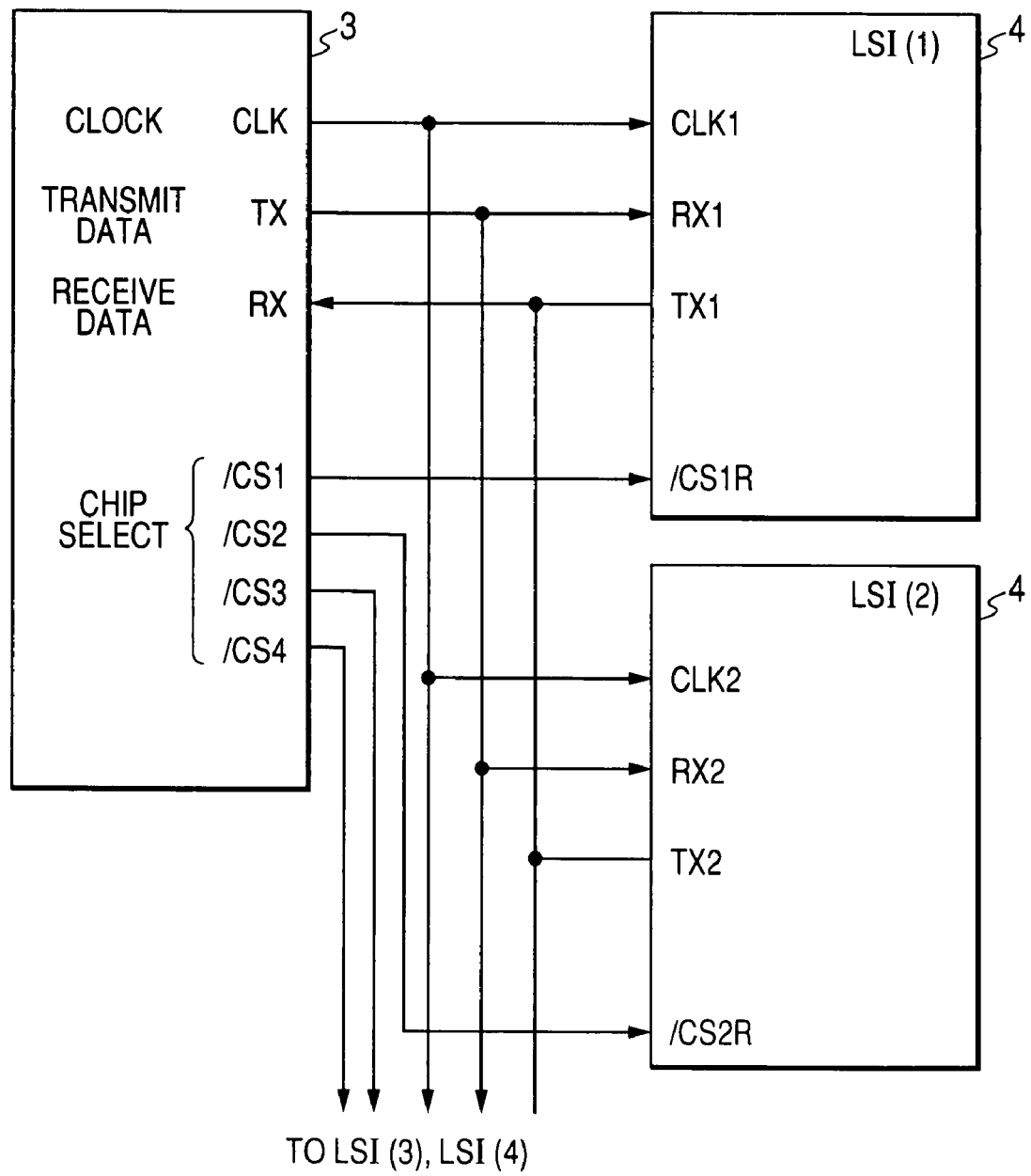
FIG. 18 is a connection diagram showing connections between the microcomputer and the LSIs in a second embodiment of the invention.

The second embodiment differs from the first embodiment in the method of communication between the microcomputer 3 and the four LSIs 4. FIG. 18 is a connection diagram showing the connections between the microcomputer 3 and the LSIs 4 in the second embodiment.

As shown in FIG. 18, in the second embodiment, unlike the first embodiment, the number of communicating lines carrying transmit data items sent from the microcomputer 3 to the LSIs 4, and the number of communication lines carrying receive data items which the microcomputer 3 receives from the LSIs 4 are both one, and the microcomputer 3 and the LSIs 4 are configured to perform serial communication between each other. The second embodiment differs from the first embodiment also in that a strobe signal is not outputted.

Figure 19:
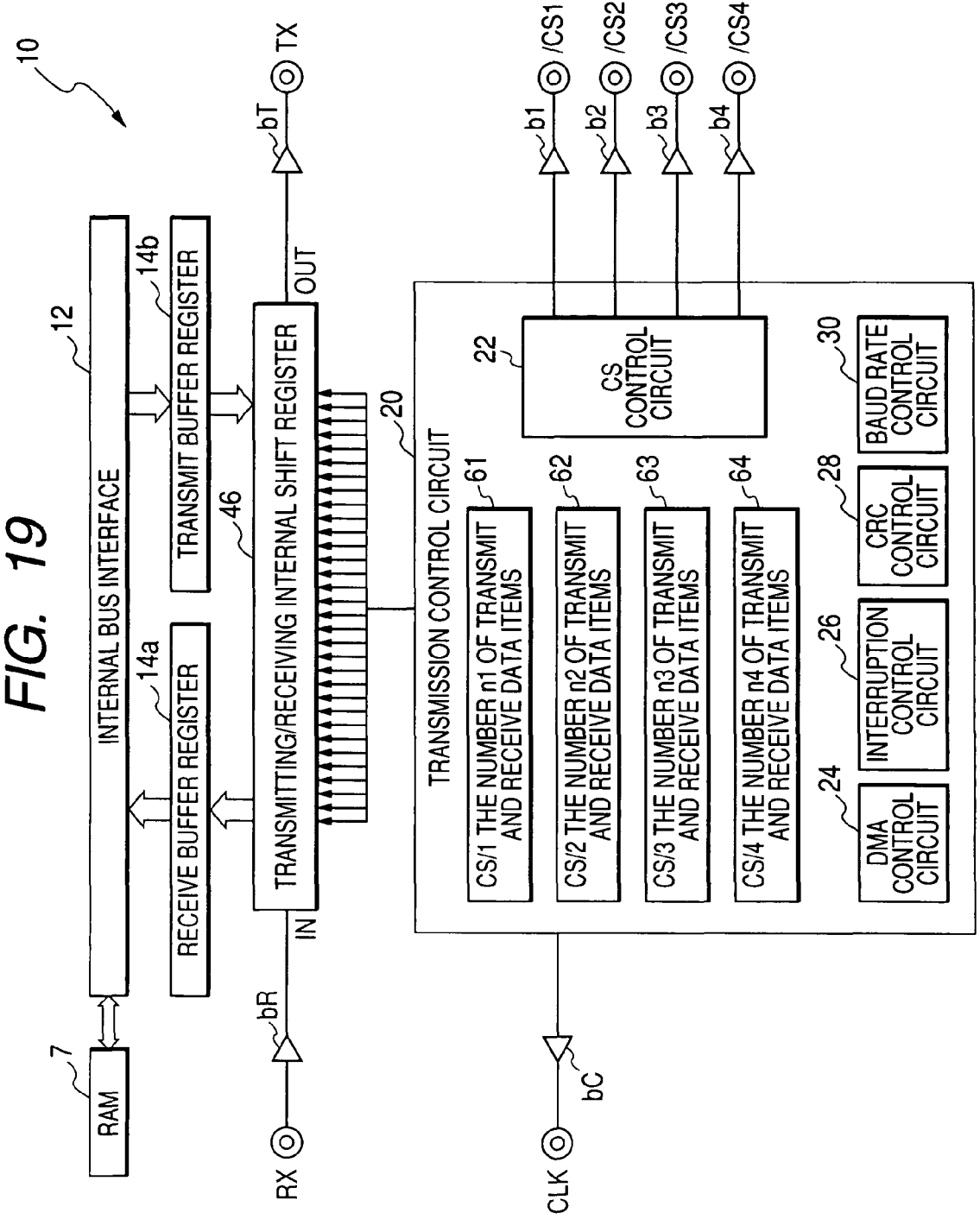
FIG. 19 is a diagram showing the structure of the communication control circuit included in the microcomputer of the ECU according to the second embodiment of the invention.

FIG. 19 shows a structure of the microcomputer 3 in the second embodiment. The microcomputer 3 in the second embodiment differs from the microcomputer 3 in the first embodiment in that a transmitting/receiving internal shift register 46 is provided instead of the receiving internal shift register 16a and the transmitting internal shift register 16b, the clock generating circuit 18 is not provided, and registers 61 to 64 for storing the numbers n1 to n4 of sum of transmit and receive data items. The microcomputer 3 in the second embodiment differs from the microcomputer 3 in the first embodiment also in the structure of the CS control circuit 22.

Figure 20:
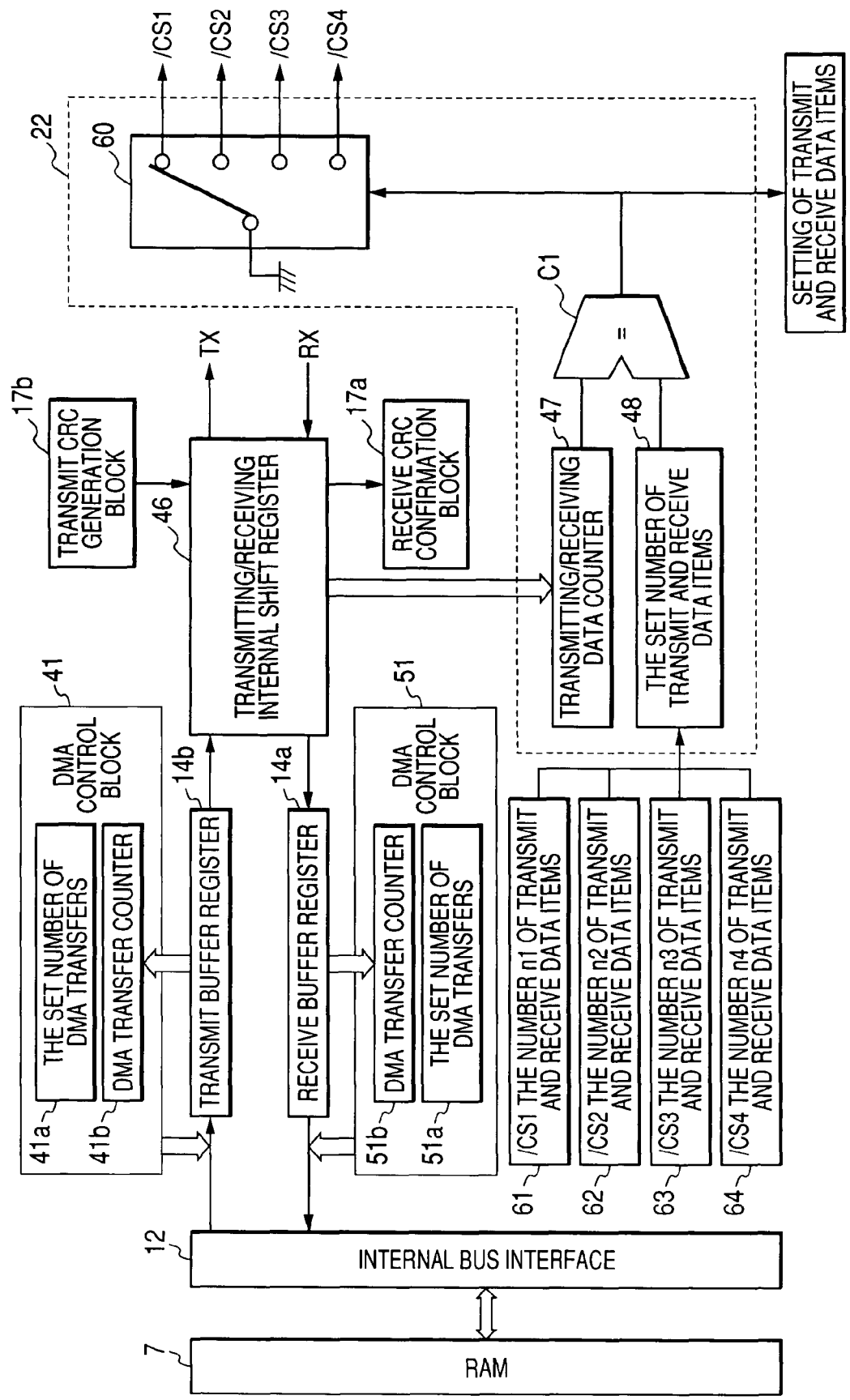
FIG. 20 is a diagram showing the structures of a CS control circuit included in the communication control circuit of the second embodiment, and its periphery.

FIG. 20 is a diagram showing the structures of the CS control circuit 22, and its periphery. As shown in FIG. 20, the CS control circuit 22 in the second embodiment differs from the CS control circuit 22 in the first embodiment in that transmit/receive data counter 47 is provided instead of the transmit data counter 44 and the receive data counter 54, a register 48 for storing the numbers n1 to n4 of sum of transmit data items and receive data items is provided instead of the register 45 for storing the number of transmit data items and the register 55 for storing the number of receive data items, and the logic production circuit 50 is eliminated.

The operation of the transmitting/receiving internal shift register 46 is basically the same as that of the receiving internal shift register 16a and the transmitting internal shift register 16b. It should be noted that the transmitting/receiving internal shift register 46 cannot store receive data items and transmit data items at once.

In FIG. 20, the transmit/receive data counter 47 counts the number of transmit data items and the number of receive data items altogether. More particularly, the transmitting/receiving internal shift register 46 outputs, bit by bit, transmit data items inputted from the transmit buffer register 14b to a buffer bT (see FIG. 19) as a transmission circuit. And the transmitting/receiving internal shift register 46 outputs a transmission completion signal to the transmit/receive data counter 47 when it has outputted bits of one transmit data item. In addition, the transmitting/receiving internal shift register 46 is inputted with, bit by bit, receive data items through a buffer bR (see FIG. 19) as a reception circuit. And the transmitting/receiving internal shift register 46 outputs a reception completion signal to the transmit/receive data counter 47 when it has been inputted with bits of one receive data item.

The transmit/receive data counter 47 counts the transmission completion signal and the reception completion signal altogether.

The numbers n1 to n4 of sum of transmit data items and receive data items are stored in the register 48 successively. The comparator circuit C1 compares the count value of the transmit/receive data counter 47 with the number of sum of transmit data items and receive data items, and outputs a high level signal to the CS selection circuit 60 when they coincide with each other.

As understood from the above, the same advantages offered by the first embodiment can be obtained by the second embodiment in which the communication system includes only one communication line common to transmit data items and receive data items. It is a matter of course that various modifications can be made to the above described embodiments.

For example, although the CPU 5 performs the process of FIG. 14 when an interruption has occurred, the CPU 5 may perform this process during a period when the interruption does not occur. The first embodiment may be modified not to use the data strobe method. The second embodiment may be modified to use the data strobe method.

The present invention is applicable to a communication system in which a master ECU and a plurality of slave ECUs perform communication therebetween.

The above explained preferred embodiments are exemplary of the invention of the present application which is described solely by the claims appended below. It should be understood that modifications of the preferred embodiments may be made as would occur to one of skill in the art.

What is claimed is:

1. A communication system for control of a vehicle engine comprising:
   a master device;
   a plurality of slave devices;
   a communication line commonly connecting said master device and said slave devices for data communication therebetween; and
   a plurality of control lines individually connecting said master device and said slave devices,
   said communication system being configured such that a selected one of said slave devices which is applied with a communication permission signal from said master device through a corresponding one of said control lines performs communication with said master device,
   wherein said master device includes:
   a first counter counting a first number of data items that has been sent from said master device to said slave device performing communication with said master device;
   a first comparator comparing said first number with a second number predetermined for said slave device performing communication with said master device, and outputting a first signal when said first and second numbers coincide with each other;
   a second counter counting a third number of data items that has been sent to said master device from said slave device performing communication with said master device;
   a second comparator comparing said third number with a predetermined fourth number, and outputting a second signal when said third and fourth numbers coincide with each other; and
   a switching circuit that changes internal connection thereof such that said communication permission signal is applied to another one of said slave devices which should perform communication with said master device next, when said first and second signals have been outputted from said first and second comparators, respectively;
   wherein said master device includes a ROM as a memory device for storing both of said second number and said fourth number for each of said slave devices;
   wherein said master device includes an interruption control circuit configured to integrate a count value of said first counter and a count value of said second counter while said slave devices are applied with said communication permission signal once in succession, and generate an interruption at a later one of a timing at which an integrated value of said count value of said first counter becomes equal to a sum of said second numbers predetermined for said slave devices, and a timing at which an integrated value of said count value of said second counter becomes equal to a sum of said fourth numbers predetermined respectively for said slave devices.

2. The communication system according to claim 1, wherein said master device further includes a RAM, a transfer circuit, a data transmission circuit, and a data reception circuit, said RAM storing transmit data items to be sent to said slave devices and storing data items sent from said slave devices, said transfer circuit operating to transfer data items to be sent to said slave device performing communicating with said master device from said RAM to said data transmission circuit, and to transfer data items sent from said slave device performing communication with said master device and received at said data reception circuit to said RAM.

3. The communication system according to claim 2, wherein said transfer circuit is a DMA controller having a plurality of DMA channels having different DMA-transferable data bit lengths, said DMA controller being configured to perform DMA-transfer by use of one of said DMA channels which has a data bit length capable of storing all data items to be transferred at once.

4. The communication system according to claim 3, wherein said transfer circuit includes a DMA-channel-activating function of, after completion of DMA transfer of as many data items as indicated by said second number to said slave device currently communicating with said master device, activating one of said DMA channels which should communicate with said master device next, and after completion of DMA transfer of as many data items as indicated by said fourth number from said slave device currently communicating with said master device, activating one of said DMA channels which should communicate with said master device next.

5. The communication system according to claim 1, wherein said master device includes a memory device for storing a communication bit rate for each of said slave devices, and is configured to perform communication with said slave devices at said communication bit rates stored in said memory device, respectively.

6. The communication system according to claim 5, wherein said memory device stores a communication bit rate for data transmission and a communication bit rate for data reception for each of said slave devices.

7. The communication system according to claim 1, wherein said master device includes a memory device for storing a data bit length for each of said slave devices, and is configured to perform communication with said slave devices at said data bit lengths stored in said memory device, respectively.

8. The communication system according to claim 7, wherein said memory device stores a data bit length for data transmission and a data bit length for data reception for each of said slave devices.

9. The communication system according to claim 1, wherein said master device includes a check code control circuit that stores, for each of said slave devices, conditions under which error check codes are added to data items to be sent and is configured to add error check codes to be sent under said stored conditions.

10. The communication system according to claim 9, wherein said conditions include an error code insertion interval length, and said check code control circuit is configured to insert an error check code to data items each time said first counter counts as many data items as indicated by said error code insertion interval length.

11. The communication system according to claim 9, wherein each of said slave devices is configured to add error check codes to data items to be sent to said master device, and said master device includes, for each of said slave devices, an error register configured to be set with a flag when said master device detects an error on the basis of said error check codes for each of said slave devices.

12. The communication system according to claim 1, wherein said master device and each of said slave devices are configured to perform serial communication therebetween.

13. The communication system according to claim 1, wherein said communication line is a differential two-wired line including two communication wires, and said master device and each of said slave devices are configured to perform differential communication therebetween.

14. The communication system according to claim 1, wherein said master device includes a clock generating circuit, and said master device and each of said slave devices have a latch circuit configured to latch data bits of received data items in synchronization with one or both of rising timings and falling timings of a clock generated by said clock generating circuit.

15. The communication system according to claim 1, wherein said master device and each of slave devices include a strobe signal output circuit outputting a strobe signal whose output logic level changes when a logic level of a current data signal of data items being sent continues at the same level as a preceding data signal, and does not change when said logic level does not continue at the same level as said preceding data signal, an exclusive OR circuit that outputs a high level signal when only one of said data signal and said strobe signal is at high level, and outputs a low level signal when both of said data signal and said strobe signal are at high level or at low level, and a latch circuit that latches data items to be received in synchronization with rising timings and falling timings of signals outputted from said exclusive OR circuit.

16. An electronic control unit for vehicle control comprising:
a master device;
a plurality of slave devices;
a communication line commonly connecting said master device and said slave devices for data communication therebetween; and
a plurality of control lines individually connecting said master device and said slave devices,
said master device, slave devices, communication line, and control lines constituting a communication system having a configuration that a selected one of said slave devices which is applied with a communication permission signal from said master device through a corresponding one of said control lines performs communication with said master device,
wherein said master device includes:
a first counter counting a first number of data items that has been sent from said master device to said slave device performing communication with said master device;
a first comparator comparing said first number with a second number predetermined for said slave device performing communication with said master device, and outputting a first signal when said first and second numbers coincide with each other;
a second counter counting a third number of data items that has been sent to said master device from said slave device performing communication with said master device;
a second comparator comparing said third number with a predetermined fourth number, and outputting a second signal when said third and fourth numbers coincide with each other; and
a switching circuit that changes internal connection thereof such that said communication permission signal is applied to another one of said slave devices which should perform communication with said master device next, when said first and second signals have been outputted from said first and second comparators, respectively;
wherein said master device includes a ROM as a memory device for storing both of said second number and said fourth number for each of said slave devices;
wherein said master device includes an interruption control circuit configured to integrate a count value of said first counter and a count value of said second counter while said slave devices are applied with said communication permission signal once in succession, and generate an interruption at a later one of a timing at which an integrated value of said count value of said first counter becomes equal to a sum of said second numbers predetermined for said slave devices, and a timing at which an integrated value of said count value of said second counter becomes equal to a sum of said fourth numbers predetermined respectively for said slave devices.

* * * * *